United States Patent
Cho et al.

(10) Patent No.: US 9,232,035 B2
(45) Date of Patent: Jan. 5, 2016

(54) ELECTRONIC DEVICE FOR PREVENTING LEAKAGE OF RECEIVED SOUND

(71) Applicant: Samsung Electronics Co., Ltd., Gyeonggi-do (KR)

(72) Inventors: Joon-Rae Cho, Seoul (KR); Jang-Hoon Kang, Seoul (KR); Byoung-Hee Lee, Seoul (KR); Jong-Seok Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/258,539

(22) Filed: Apr. 22, 2014

(65) Prior Publication Data

US 2014/0315605 A1      Oct. 23, 2014

(30) Foreign Application Priority Data

Apr. 22, 2013   (KR) .................. 10-2013-0044350

(51) Int. Cl.
*H04M 1/02*   (2006.01)
*H04M 1/00*   (2006.01)
*H04M 1/03*   (2006.01)
*H04M 9/00*   (2006.01)

(52) U.S. Cl.
CPC ................... *H04M 1/035* (2013.01)

(58) Field of Classification Search
CPC ............... H04R 2499/11; H04R 17/00; H04R 2499/15; H04R 1/02; H04R 1/1016; H04R 7/045; H04R 1/028; H04R 1/345; H04R 1/225; H04R 2400/03; H04R 2460/13; H04R 1/025; H04R 1/2811; H04R 31/006; H04M 1/03; H04M 1/035
USPC ........ 455/550.1, 575.1, 566, 564, 350, 575.8, 455/90.3
See application file for complete search history.

(56) References Cited

U.S. PATENT DOCUMENTS

| | | | |
|---|---|---|---|
| 2003/0003879 A1* | 1/2003 | Saiki et al. ...................... 455/90 |
| 2006/0097855 A1* | 5/2006 | Turnbull et al. ........... 340/425.5 |
| 2007/0010283 A1* | 1/2007 | Kim ........................... 455/550.1 |
| 2009/0169041 A1 | 7/2009 | Zurek et al. |
| 2009/0190770 A1 | 7/2009 | Kesterson |
| 2009/0213557 A1* | 8/2009 | Wen ............................. 361/748 |
| 2009/0247244 A1* | 10/2009 | Mittleman et al. .......... 455/575.1 |
| 2010/0218203 A1* | 8/2010 | Kusumi ....................... 720/601 |
| 2010/0246873 A1* | 9/2010 | Chen ............................ 381/333 |
| 2012/0195447 A1* | 8/2012 | Hiruma et al. ................ 381/306 |
| 2014/0072141 A1* | 3/2014 | Cohen et al. .................... 381/91 |

FOREIGN PATENT DOCUMENTS

| KR | 20000038271 | 7/2000 |
| KR | 20000066930 | 11/2000 |
| KR | 1020060061451 | 6/2006 |
| KR | 100652736 | 11/2006 |

* cited by examiner

*Primary Examiner* — Inder Mehra
(74) *Attorney, Agent, or Firm* — The Farrell Law Firm, P.C.

(57) ABSTRACT

An electronic device for preventing leakage of a received sound is provided. The electronic device includes a receiver which outputs the received sound; a receiving portion which receives the receiver; and a hole which communicates with the receiving portion.

18 Claims, 16 Drawing Sheets

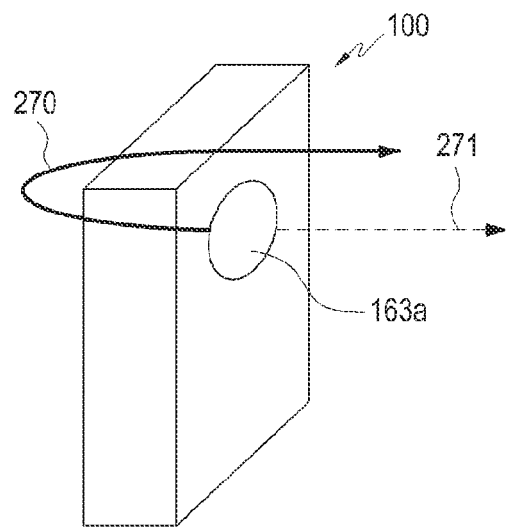
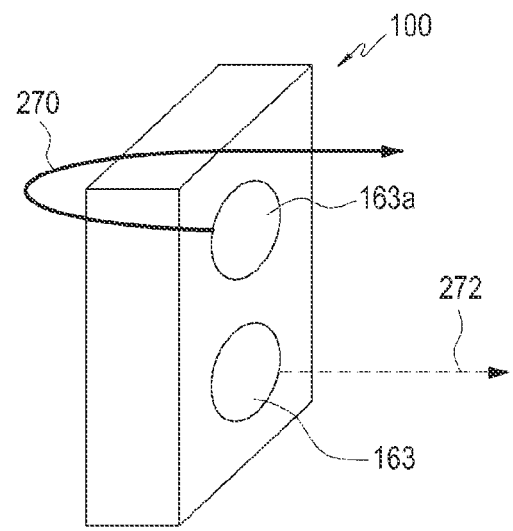
FIG.6A    FIG.6B
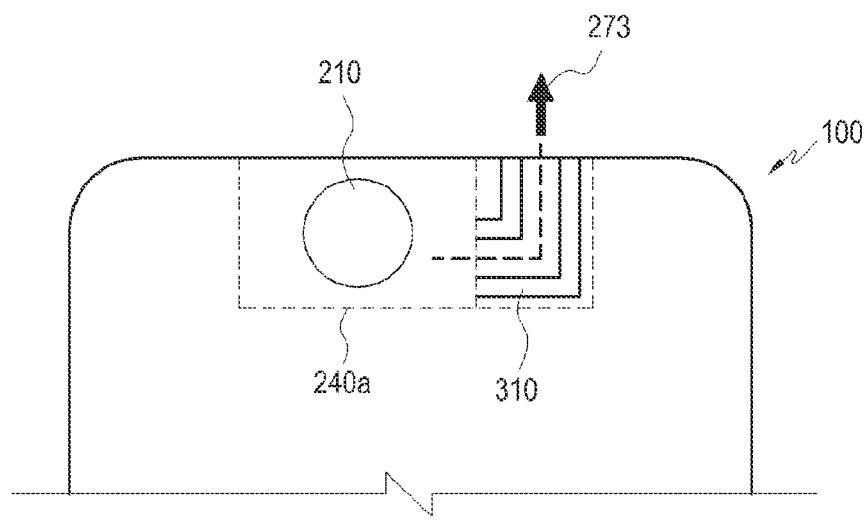
FIG.7

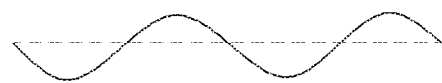
FIG.17A
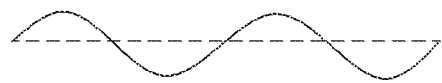
FIG.17B
---
FIG.17C

ELECTRONIC DEVICE FOR PREVENTING LEAKAGE OF RECEIVED SOUND

PRIORITY

This application claims priority under 35 U.S.C. §119(a) to Korean Patent Application Serial No. 10-2013-0044350 filed in the Korean Intellectual Property Office on Apr. 22, 2013, the entire content of which is incorporated herein by reference.

BACKGROUND

1. Field of the Invention

The present invention relates generally to a technology of treating a received sound in an electronic device, and more particularly to an electronic device for preventing a received sound from leaking outside of the electronic device.

2. Description of the Related Art

A conventional electronic device enables a receiver to reproduce and transfer a sound to a user receiving a call so that the user hears contents in a voice call.

The user may perform the voice call through an earphone or a Bluetooth headset.

The conventional electronic device allows the received sound to leak outside of the electronic device, and causes a problem of personal security as it relates to the contents of the voice call. That is, in a public place under a calm environment, the user may unintentionally leak the contents of the voice call to unknown people, and the unknown people may unintentionally hear the contents in the voice call.

When the sound reproduced by the receiver is loud, it is advantageous of the user to clearly understand the content of the voice call, but the received sound leaking out becomes louder.

If the user performs the voice call using an earphone, the leakage of the received sound can be prevented. However, an additional unit, e.g., an earphone, is required and it is difficult for the user to hear sound from outside of the electronic device during the voice call.

SUMMARY

The present invention has been made to address at least the above-mentioned problem in the conventional art, and to provide at least the advantages described below. Accordingly, an aspect of the present invention is to provide an electronic device which is capable of preventing leakage of a received sound so that people near a user cannot hear the received sound when the user performs a voice call.

Another aspect of the present invention is to provide an electronic device which has a structure in which leakage of the received sound can be prevented.

Another aspect of the present invention is to provide an electronic device that can reduce an amount of the received sound leaking out from the voice call, so that the user can secure privacy in receiving the call without use of a separate unit such as the earphone or the Bluetooth headset.

In accordance with an aspect of the present invention, an electronic device for preventing leakage of a received sound is provided. The electronic device includes a receiver which outputs the received sound; a receiving portion which receives the receiver; and a hole which communicates with the receiving portion.

In accordance with another aspect of the present invention, an electronic device for preventing leakage of a received sound is provided. The electronic device includes a receiver which outputs a first received sound; a speaker which outputs a phase-inverted received sound having an inverse phase with respect to a phase of the first received sound or a second received sound; and a controller which controls the speaker to output the phase-inverted received sound in a mode of preventing leakage of the received sound, and to output the second received sound in a mode of outputting the received sound.

BRIEF DESCRIPTION OF THE DRAWINGS

The above and other aspects, features, and advantages of the present invention will be more apparent from the following detailed description taken in conjunction with the accompanying drawings, in which:

FIGS. 6A and 6B are views schematically illustrating a configuration capable of preventing leakage of a received sound from an electronic device according to an embodiment of the present invention;

FIG. 7 is a view schematically illustrating a rear sound guide of an electronic device according to an embodiment of the present invention;

FIGS. 17A-17C illustrate a received sound of a receiver and a speaker, and the destructive interference of the received sounds;

DETAILED DESCRIPTION OF EMBODIMENTS OF THE PRESENT INVENTION

Figure 1:
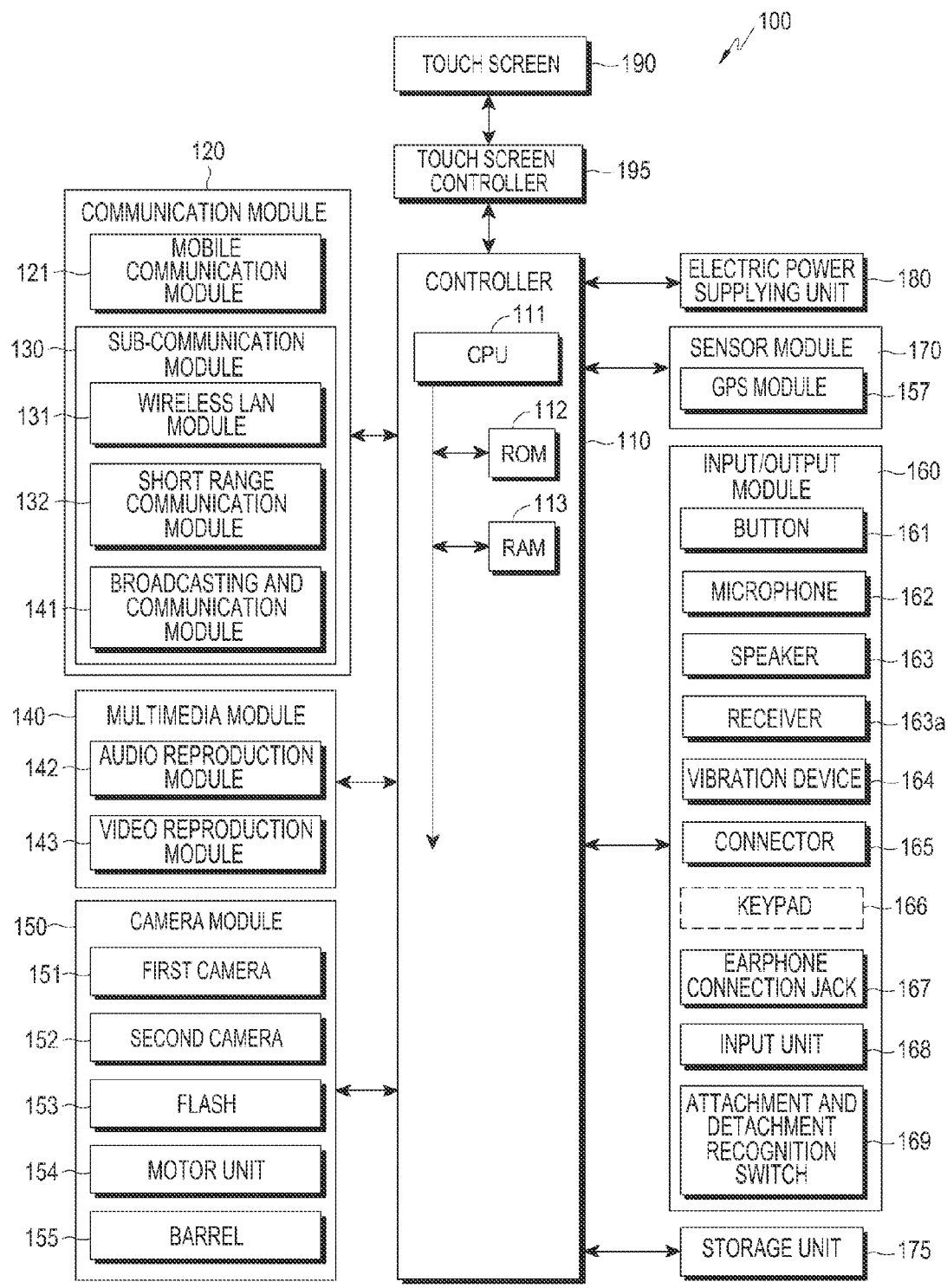
FIG. 1 is a block diagram illustrating an electronic device according to an embodiment of the present invention.

The present invention may ha various modifications and various embodiments, among which specific embodiments will now be described in detail with reference to the accompanying drawings. However, it should be understood that the present invention is not limited to the specific embodiments, but the present invention includes all modifications, equivalents, and alternatives within the spirit and the scope of the present invention.

Although the terms including an ordinal number such as first, second, etc. can be used for describing various elements, the structural elements are not restricted by the terms. The terms are only used to distinguish one element from another element. For example, without departing from the scope of the present invention, a first structural element may be named a second structural element. Similarly, the second structural element also may be named the first structural element. As used herein, the term "and/or" includes any and all combinations of one or more associated items.

The terms used in this application are merely for the purpose of describing particular embodiments and are not intended to limit the present invention. A singular expression includes a plural expression unless the context clearly indicates otherwise. In the description, it should be understood that the terms "include" or "have" indicate existence of a feature, a number, a step, an operation, a structural element, parts, or a combination thereof, and do not previously exclude the existences or probability of the addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present specification.

The electronic device of the present invention may be a specific device having a receiver, and be referred to as a terminal, a portable terminal, a mobile terminal, a communication terminal, a portable communication terminal, a portable and mobile terminal and so on.

For example, the electronic device may be a smartphone, a portable phone, a game player, a TV, a display unit, a heads-up display unit for a vehicle, a notebook computer, a laptop computer, a tablet Personal Computer (PC), a Personal Media Player (PMP), a Personal Digital Assistants (PDA), and/or the like. The electronic device may be implemented as a portable communication terminal which has a wireless communication function and a pocket size. Further, the electronic device may be a flexible device or a flexible display unit.

A representative structure of the electronic device refers to a portable phone, and some structural elements of the representative structure of the electronic device may be omitted or modified if necessary.

FIG. 1 is a block diagram illustrating an electronic device according to an embodiment of the present invention.

Referring to FIG. 1, the electronic device 100 can be connected with an external electronic device by using at least one of a communication module 120, a connector 165, and an earphone connection jack 167. The external device may include any one of various devices detachably attached to the electronic device 100 by a wire, such as an earphone, an external speaker, a Universal Serial Bus (USB) memory, a charger, a cradle/dock, a Digital Multimedia Broadcasting (DMB) antenna, a mobile payment related device, a healthcare device (blood sugar tester and/or the like), a game player, a car navigation device and/or the like. Further, the electronic device may include a Bluetooth communication unit, a Near Field Communication (NFC) unit, a WiFi Direct communication unit and a wireless Access Point (AP). Further, the electronic device 100 may be connected with another mobile device or electronic device, for example, one of a portable phone, a smart phone, a tablet PC, a desktop PC, and a server in a wired or wireless manner.

Referring to FIG. 1, the electronic device 100 may include at least one touch screen 190 and at least one touch screen controller 195. Further, the electronic device 100 may include a controller 110, a communication module 120, a multimedia module 140, a camera module 150, an input/output module 160, a sensor module 170, a storage unit 175, and a power supply unit 180.

The communication module 120 may include a mobile communication module 121, a sub communication module 130, and a broadcasting communication module 141.

The sub communication module 130 may include at least one of a wireless LAN module 131, a short range communication module 132 and a broadcasting and communication module 141. The multimedia module 140 may include at least one of an audio reproduction module 142 and a video reproduction module 143. The camera module 150 may include at least one of a first camera 151 and a second camera 152. Further, the camera module 150 of the electronic device 100 according to the present invention includes at least one of a barrel 155 for zooming in/zooming out the first and/or second cameras 151 and 152, a motor 154 for controlling a movement of the barrel 155 to zoom in/zoom out the barrel 155, and a flash 153 for providing light for photographing according to a main use of the electronic device 100. The input/output module 160 may include at least one of a button 161, a microphone 162, a speaker 163, a receiver 163a, a vibration device 164, the connector 165, a keypad 166, the earphone connection jack 167, an input unit 168 and an attachment/detachment recognition switch 169. The sensor module 170 may include a GPS module 157.

The controller 110 may include a Central Processing Unit (CPU) 111, a Read-Only Memory (ROM) 112 storing a control program for controlling the electronic device 100, and a Random-Access Memory (RAM) 113 used as a storage area for storing a signal or data input from the outside of the electronic device 100 or for work performed in the electronic device 100. The CPU 111 may include a single core type CPU or a multi core type CPU such as a dual core type CPU, a triple core type CPU, or a quadruple core type CPU. The CPU 111, the ROM 112, and the RAM 113 can be connected to one other through an internal bus.

The controller 110 controls the communication module 120, the multimedia module 140, the camera module 150, the input/output module 160, the sensor module 170, the storage unit 175, the power supply unit 180, the touch screen 190, and the touch screen controller 195.

The controller 110 detects a user input through the input unit 168 or detects a touchable user input such as through the use of a user's finger, where the user's finger touches or approaches an object or is located close to an object in a state where a plurality of objects or items are displayed on the touch screen 190, and identifies an object corresponding to a position of the touch screen 190 where the touchable user input is generated. The user input through the touch screen 190 includes one of a direct touch input of directly touching the object and a hovering input which is an indirect touch input of approaching the object within a preset recognition range but not directly touching the object. For example, when the input unit 168 is located close to the touch screen 190, an object located directly under the input unit 168 may be selected. According to the present invention, user inputs include a gesture input through the camera module 150, a switch/button input through the button 161 or the keypad 166, a voice input through the microphone 162 and/or the like as well as the user input through the touch screen 190.

The object or item (or function item) may be displayed on the touch screen 190 of the electronic device 100. For example, the object or item indicates at least one of an application, a menu, a document, a widget, a picture, a video, an E-mail, an SMS message, and an MMS message, and may be selected, executed, deleted, canceled, stored, and modified by a user input means. The item may be used as a meaning including a button, an icon (or short-cut icon), a thumbnail image, or a folder storing at least one object in the electronic device. Further, the item may be displayed in the form of an image, a text and/or the like.

The short-cut icon is an image displayed on the touch screen 190 of the electronic device 100 to rapidly execute an application or operation of phone communication, a contact number, a menu and/or the like provided in the electronic device 100. When a command or selection for executing the application or the operation is input, the short-cut icon executes the corresponding application.

Further, the controller 110 detects a user input event such as a hovering event as the input unit 168 approaches the touch screen 190 or is located close to the touch screen 190.

When a user input event is generated according to a preset item or in a preset manner, the controller 110 performs a preset program operation corresponding to the user input event.

The controller 110 can output a control signal to the input unit 168 or the vibration device 164. The control signal includes information on a vibration pattern, and the input unit 168 or the vibration device 164 generates a vibration according to the vibration pattern. The information on the vibration pattern indicates the vibration pattern itself, an indicator of the vibration pattern, and/or the like. Alternatively, the control signal includes only a request for generating the vibration.

The electronic device 100 may include at least one of the mobile communication module 121, the wireless LAN module 131 and the short-range communication module 132.

The mobile communication module 121 enables the electronic device 100 to be connected with an external electronic device through mobile communication by using one or more antennas according to a control of the controller 110. The mobile communication module 121 transmits/receives a wireless signal for voice call, video call, a Short Message Service (SMS), or a Multimedia Message Service (MMS) to/from a portable phone, a smart phone, a tablet PC, or another device having a phone number input into the electronic device 100.

The sub-communication module 130 may include at least one of the wireless LAN module 131 and the short range communication module 132. For example, the sub-communication module 130 may include only the wireless LAN module 131 or only the short range communication module 132. Alternatively, the sub-communication module 130 may also include both the wireless LAN module 131 and the short range communication module 132.

The wireless LAN module 131 may be connected to the Internet in a place where a wireless Access Point (AP) is installed, under a control of the controller 110. The wireless LAN module 131 supports a wireless LAN standard (IEEE802.11x) of the Institute of Electrical and Electronics Engineers (IEEE). The short range communication module 132 can wirelessly perform short range communication between the electronic device 100 and an external electronic device under the control of the controller 110. The short range communication scheme may include a Bluetooth communication scheme, an Infrared Data Association (IrDA) scheme, a Wi-Fi Direct communication scheme, a Near Field Communication (NFC) scheme, and/or the like.

The controller 110 transmits a control signal according to a vibration pattern to the input unit 168 through the sub communication module 130.

The broadcasting communication module 141 receives a broadcasting signal (e.g., a TV broadcasting signal, a radio broadcasting signal or a data broadcasting signal) or broadcasting additional information (e.g., Electronic Program Guide (EPS) or Electronic Service Guide (ESG)) which are transmitted from a broadcasting station, through a broadcasting and communication antenna, under the control of the controller 110.

The multimedia module 140 may include the audio reproduction module 142 or the video reproduction module 143. The audio reproduction module 142 reproduces a digital audio file (for example, a file having a file extension of mp3, wma, ogg, or way) which is stored or received in the storage unit 175, under the control of the controller 110. The video reproduction module 143 reproduces a digital video file (for example, a file having a file extension of mpeg, mpg, mp4, avi, mov, or mkv) stored or received, under the control of the controller 110. The video reproduction module 143 can also reproduce the digital audio file.

The multimedia module 140 may be integrated in the controller 110.

The camera module 150 may include at least one of the first camera 151 and the second camera 152 for photographing a still image or a video, under the control of the controller 110. Further, the camera module 150 may include at least one of the barrel 155 performing a zoom-in/out for photographing a subject, the motor 154 controlling a movement of the barrel 155, and the flash 153 providing an auxiliary light required for photographing the subject. The first camera 151 may be disposed on a front surface of the electronic device 100, and the second camera 152 may be disposed on a rear surface of the electronic device 100.

Each of the first and second cameras 151 and 152 may include a lens system, an image sensor and/or the like. Each of the first and second cameras 151 and 152 converts an optical signal input (or photographed) through the lens system to an electrical image signal (or a digital image) and outputs the converted electrical image signal to the controller 110. Then, the user may photograph a video or a still image through the first and second cameras 151 and 152.

The input/output module 160 may include at least one button 161, at least one microphone 162, at least one speaker 163, the receiver 163a, at least one vibration device 164, the connector 165, a keypad 166, the earphone connection jack 167, and the input unit 168. The input/output module 160 is not limited thereto, and a cursor control such as a mouse, a track ball, a joystick, or cursor direction keys may be provided to control a movement of a cursor on the touch screen 190.

The button 161 may be formed on a front surface, a side surface, or a rear surface of a housing (or a case) of the electronic device 100, and may include at least one of a power/lock button, a volume button, a menu button, a home button, a back button, and a search button.

The microphone 162 receives a voice or a sound to generate an electrical signal according to a control of the controller 110.

The speaker 163 outputs sounds corresponding to various signals or data (e.g., wireless data, broadcasting data, digital audio data, digital video data and/or the like) to the outside of the electronic device 100 under the control of the controller 110. The speaker 163 also outputs sounds (e.g., a button tone corresponding to a telephone call, a ringing tone, and a voice of a counterpart user) corresponding to functions performed by the electronic device 100. One speaker 163 or a plurality of speakers 163 may be formed on a suitable position or positions of the housing of the electronic device 100.

Figure 2:
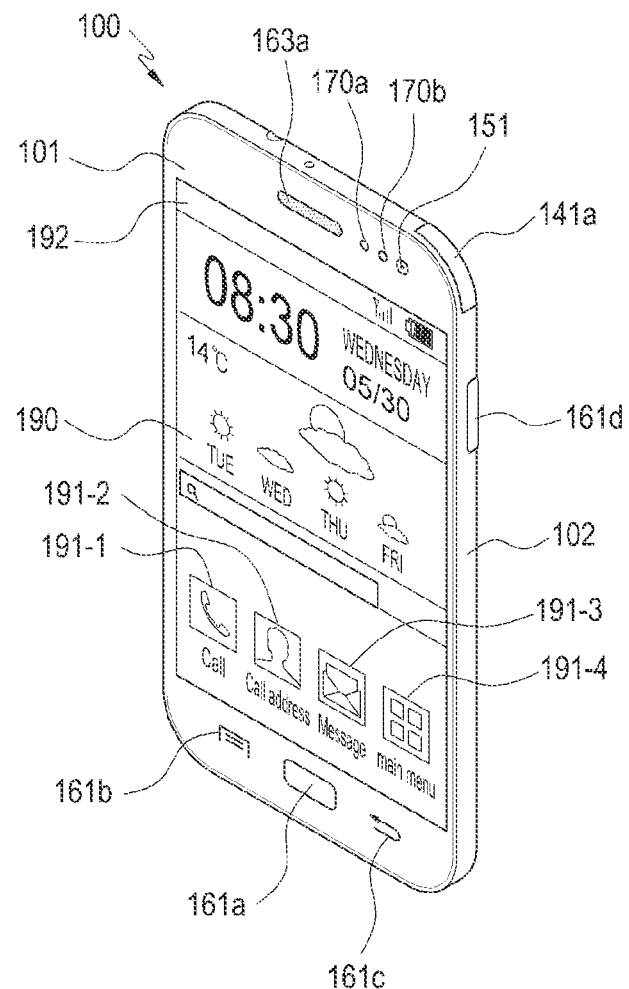
FIG. 2 is a perspective view illustrating a front surface of an electronic device according to an embodiment of the present invention.

As show in FIG. 2, the receiver 163a outputs sounds corresponding to various signals or data (for example, received sound signal, wireless data, broadcasting data, digital audio data, digital video data and/or the like) to the outside of the electronic device 100 according to a control of the controller 110. The receiver 163a outputs sounds (e.g., a button tone corresponding to a telephone call, a ringing tone, and a voice of a counterpart user) corresponding to functions performed by the electronic device 100. One or more receivers 163a may be formed on a suitable position or positions of the housing of the electronic device 100.

The vibration device 164 converts an electrical signal to a mechanical vibration under the control of the controller 110. For example, when the electronic device 100 in a vibration mode receives a voice call or a video call from another device, the vibration device 164 operates. One or more vibration devices 164 may be formed within the housing of the electronic device 100. The vibration device 164 may operate in response to a user input through the touch screen 190.

The connector 165 is used as an interface for connecting the electronic device 100 with an external electronic device or an electric power source. The controller 110 may transmit data stored in the storage unit 175 of the electronic device 100 to an external electronic device or may receive data from the external electronic device through a wired cable connected to the connector 165. The electronic device 100 may receive electric power from the electric power source through the wired cable connected to the connector 165 or may charge a battery by using the electric power source.

The keypad 166 receives a key input from a user for control of the electronic device 100. The keypad 166 may include a physical keypad formed in the electronic device 100 or a virtual keypad displayed on the touch screen 190. The physical keypad formed in the electronic device 100 may be excluded according to the performance or structure of the electronic device 100.

An earphone may be inserted into the earphone connection jack 167 to be connected with the electronic device 100.

The input unit 168 may be inserted and stored in a pen insertion hole of the electronic device 100, and may be drawn back or separated from the pen insertion hole of the electronic device 100. The attachment/detachment recognition switch 169 operating in accordance with attachment and detachment of the input unit 168 is provided in one area within the electronic device 100 into which the input unit 168 is inserted, and the attachment/detachment recognition switch 169 may output signals corresponding to the attachment and detachment of the input unit 168 to the controller 110. The attachment/detachment recognition switch 169 may be configured to be in direct/indirect contact with the input unit 168 when the input unit 168 is mounted. Accordingly, the attachment/detachment recognition switch 169 generates a signal corresponding to the attachment or the detachment (that is, a signal notifying of the attachment or the detachment of the input unit 168) based on whether the attachment/detachment recognition switch 169 contacts the input unit 168 and then outputs the generated signal to the controller 110.

The sensor module 170 includes at least one sensor for detecting a status of the electronic device 100. For example, the sensor module 170 may include at least one of a proximity sensor for detecting whether the user approaches the electronic device 100, an illuminance sensor 170a (see FIG. 2) for detecting an amount of ambient light of the electronic device 100, a motion sensor (not shown) for detecting a motion, e.g., rotation, acceleration, or vibration, of the electronic device 100, a geo-magnetic sensor for detecting a point of the compass of the electronic device 100 using the Earth's magnetic field, a gravity sensor for detecting a gravity action direction, an altimeter for measuring an atmospheric pressure to detect an altitude, a GPS module 157, and/or the like.

The GPS module 157 receives radio waves from a plurality of GPS satellites in Earth's orbit, and calculates a position of the electronic device 100 by using Time of Arrival from the GPS satellites to the electronic device 100.

The storage unit 175 stores a signal or data input/output according to an operation of the communication module 120, the multimedia module 140, the camera module 150, the input/output module 160, the sensor module 170, or the touch screen 190 under the control of the controller 110. The storage unit 175 stores a control program and applications for control of the electronic device 100 or the controller 110.

The term "storage unit" refers to any data storage device such as the storage unit 175, the ROM 112 in the controller 110, the RAM 113 or a memory card, i.e. a SD card, and a memory stick, inserted in the electronic device 100. The storage unit 175 may also include a non-volatile memory, a volatile memory, a Hard Disk Drive (HDD), or a Solid State Drive (SSD).

The storage unit 175 may store applications such as a navigation application, a video call application, a game application, an alarm application based on time, images for providing a Graphical User Interface (GUI) relating to the applications, databases or data relating to a method of preventing leakage of a received sound, a document, a touch input, background images, operation programs (i.e., a menu screen, a standby screen, and/or the like), necessary for an operation of the portable device 100, images taken by the camera module 150, and/or the like.

Furthermore, the storage unit 175 can store a program and related data for a method of preventing leakage of a received sound according to an embodiment of the present invention.

The storage unit 175 is a machine-readable medium, e.g., computer-readable medium, and the phrase "the machine-readable medium" may be defined as a medium for providing data to the machine so that the machine performs a specific function. The storage unit 175 may include a non-volatile medium and a volatile medium. All of these media should be of a type that allows the commands transferred by the media to be detected by a physical instrument in which the machine reads the commands into the physical instrument.

The machine-readable medium includes, but is not limited to, at least one of a floppy disk, a flexible disk, a hard disk, a magnetic tape, a Compact Disc Read-Only Memory (CD-ROM), an optical disk, a punch card, a paper tape, a RAM, a Programmable Read-Only Memory (PROM), an Erasable PROM (EPROM), and a Flash EPROM.

The electric power supply unit 180 supplies electric power to one or more batteries arranged in the housing of the electronic device 100 under the control of the controller 110. The one or more batteries supply the electric power to the electronic device 100. Further, the electric power supply unit 180 supplies electric power input from an external electric power source through a wired cable connected to the connector 165 to the electronic device 100. In addition, the electric power supply unit 180 also supplies the electric power wirelessly input from an external electric power source through a wireless charging technology to the electronic device 100.

The electronic device 100 includes at least one touch screen 190 providing a user graphical interface corresponding to various services, e.g., a phone call, data transmission, broadcasting, and photography, to the user.

The touch screen 190 outputs an analog signal corresponding to at least one user input which is input to the GUI, to the touch screen controller 195.

The touch screen 190 receives at least one user input through a user's body, i.e., a finger, or the input unit 168, i.e., a stylus pen, an electronic pen, and/or the like.

The touch screen 190 may receive successive motions of one touch, i.e., a drag input. The touch screen 190 outputs an analog signal corresponding to the successive motions of the input touch to the touch screen controller 195.

The touch used in an embodiment of the present invention is not limited to a contact between the touch screen 190 and the finger or the input unit 168, and may include a noncontact, e.g., a case where the user input means is located within a recognition distance, e.g., 1 cm, where the user input means can be detected without a direct contact. A distance or interval within which the user input means can be recognized in the touch screen 190 may be changed according to the performance or structure of the electronic device 100. Particularly, the touch screen 190 is configured to output different values including, for example, a voltage value or a current value as an analog value detected by a direct touch event and an indirect event, i.e., a hovering event, so that the direct touch event by a contact with the user input means and the hovering event, can be distinguishably detected.

The touch screen 190 may be implemented, for example, in a resistive type, a capacitive type, an infrared type, an acoustic wave type, or combinations thereof.

Further, the touch screen 190 may include at least two touch screen panels capable of detecting a finger input and a pen input respectively, in order to distinguish an input, i.e., a finger input, by a passive type of a first user input means, i.e., a part of body such as a finger, from an input, i.e., a pen input, by an input unit 168 which is an active type of a second user input means. With the user input means, a classification of a passive type and an active type can be achieved according to whether energy such as electronic waves, electromagnetic waves and/or the like are generated or induced. The two or more touch panels provide different output values to the touch screen controller 195. Then, the touch screen controller 195 can recognize the different values input to the two or more touch panels to distinguish whether the input from the touch screen 190 is an input by the finger or an input by the input unit 168. For example, the touch screen 190 may be a combination of a capacitive typed touch screen panel and an electromagnetic resonance typed touch screen panel. Further, as described above, the touch screen 190 may include touch keys such as a menu button 161b, a back button 161c and like, and accordingly, a finger input on the touch screen 190 includes a touch input on the touch key.

The touch screen controller 195 converts an analog signal input from the touch screen 190 to a digital signal, and transmits the converted digital signal to the controller 110. The controller 110 controls the touch screen 190 by using the digital signal received from the touch screen controller 195. For example, the controller 110 allows a short-cut icon or an object displayed on the touch screen 190 to be selected or executed in response to the direct touch event or the hovering event. Further, the touch screen controller 195 may be integrated with the controller 110.

The touch screen controller 195 identifies a hovering interval or distance as well as a position of the user input by detecting a value (for example, a current value and/or the like) output through the touch screen 190, and converts the identified distance value to a digital signal (for example, a Z coordinate) to provide the converted digital signal to the controller 110. Further, the touch screen controller 195 detects a pressure applied to the touch screen 190 by the user input means by detecting the value (for example, the current value and/or the like) output through the touch screen 190, and converts the identified pressure value to a digital signal to provide the converted digital signal to the controller 110.

Figure 3:
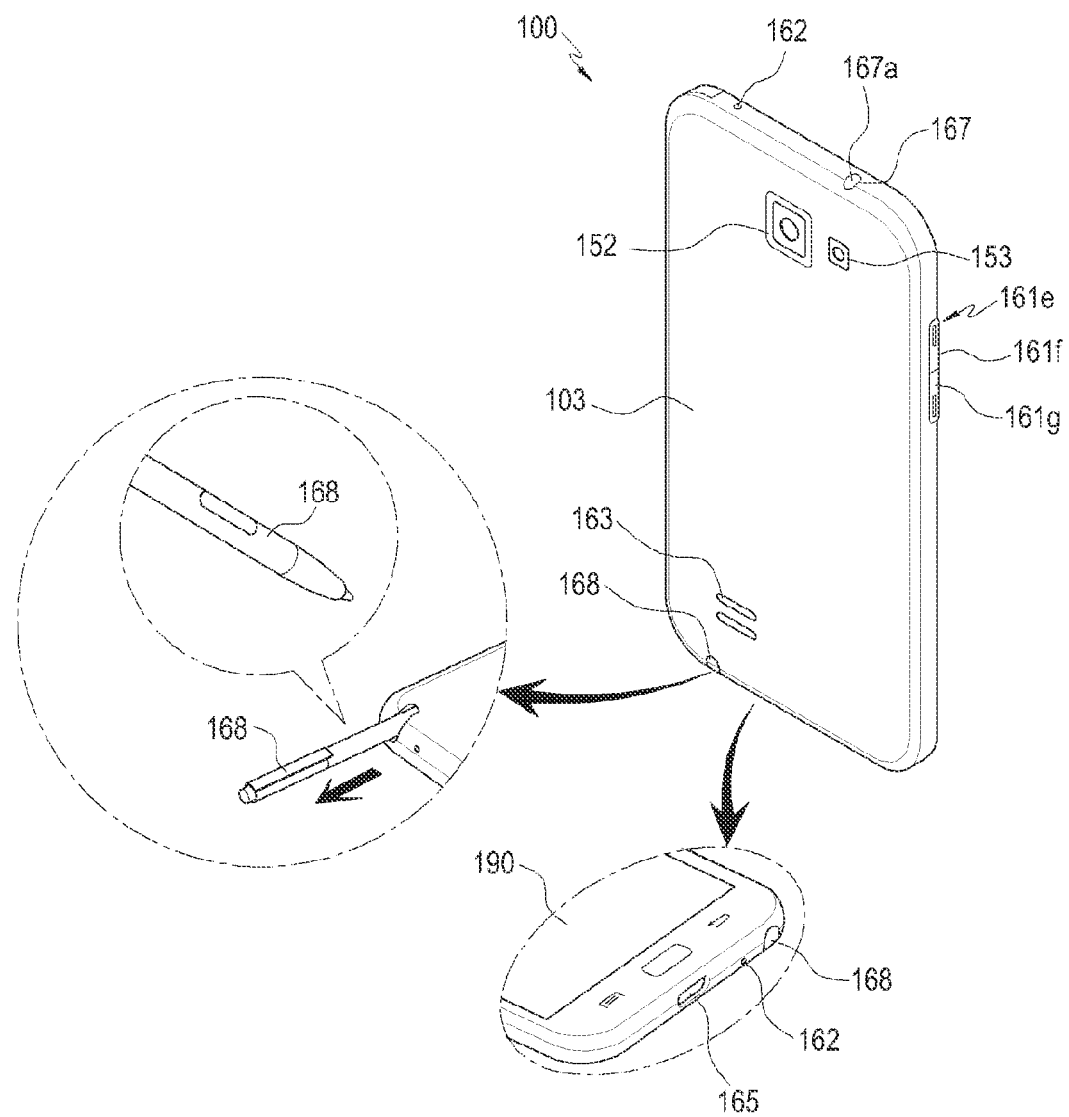
FIG. 3 is a perspective view illustrating a rear surface of an electronic device according to an embodiment of the present invention.

FIG. 2 is a perspective view illustrating a front surface of an electronic device according to an embodiment of the present invention. FIG. 3 is a perspective view illustrating a rear surface of an electronic device according to an embodiment of the present invention.

Referring to FIGS. 2 and 3, the touch screen 190 is disposed at a center portion of a front surface 100 of the electronic device 100. The touch screen 190 is largely formed to occupy 10 almost the entire front surface 101 of the electronic device 100. FIG. 2 shows an example of a main home screen displayed on the touch screen 190. The main home screen is a first screen displayed on the screen 190 when the electronic device 100 is turned on. When the electronic device 100 includes a plurality of pages which have different home screens respectively, further, the main home screen is the first home screen among the plurality of pages of home screens. Short-cut icons 191-1, 191-2, and 191-3 for executing frequently used applications, a main menu switching key 191-4, the time, the weather and/or the like may be displayed on the home screen. When the user selects the main menu switching key 191-4, the menu screen is displayed on the touch screen 190. The touch screen 190 may have a status bar 192, which displays a status of the electronic device 100, such as a charging status of a battery, intensity of a received signal and a current time, arranged at an upper end of the touch screen 190.

The touch keys such as the home button 161a, the menu button 161b, the back button 161c and/or the like, mechanical buttons, or a combination thereof may be arranged at a lower portion of the touch screen 190. Further, the touch keys may be constituted as a part of the touch screen 190.

The main home screen is displayed on the touch screen 190 through the home button 161a. For example, in the state that the main home screen, any home screen, or a menu screen is displayed on the touch screen 190, when the home button 161a is selected, the main home screen is displayed on the touch screen 190. Further, when the home button 161a is selected while applications are executed on the touch screen 190, the main home screen shown in FIG. 2 is displayed on the touch screen 190. Further, the home button 161*a* may be used to display recently used applications or a task manager on the touch screen 190.

The menu button 161*b* provides a connection menu which may be displayed on the touch screen 190. The connection menu may include a widget addition menu, a background changing menu, a search menu, an editing menu, a setup menu of a computing system configuration and/or the like.

The back button 161*c* is used for displaying the screen which was executed just before the currently executed screen or terminating the most recently used application.

The electronic device 100 may have the first camera 151, the illuminance sensor 170*a*, the proximity sensor 170*b*, and the first distance/biological sensor, which are arranged on an upper side of the front surface 101 thereof. The second camera 152, the flash 153, the speaker 163, and the second distance/biological sensor may be disposed on a rear surface 103 of the electronic device 100.

The electronic device 100 has an electric power/lock button 161*d*, a volume control button 161*e*, including a volume increasing button 161*f* and a volume reducing button 161*g*, a terrestrial DMB antenna 141*a* for receiving a broadcasting, one or more microphones 162 and/or the like. The DMB antenna 141*a* may be configured to be inserted in and drawn from an antenna insertion hole of the electronic device 100, or may be detachably attached to the electronic device 100.

Further, the connector 165 is formed on a lower side surface of the electronic device 100. A plurality of electrodes may be formed on the connector 165, and the connector 165 may be connected to an external device by wire. The earphone connection jack 167 may be formed on an upper side surface of the electronic device 100. The earphone jack may be inserted in a first hole 167*a* of the earphone connection jack 167.

Further, the input unit 168 may be inserted in a side surface of a lower portion of the electronic device 100. The input unit 168 may be inserted and maintained within the electronic device 100, and may be withdrawn or separated from the electronic device 100 when it is used.

The controller 110 controls different structural elements in the electronic device 100, so as to control overall operation of the electronic device 100.

Figure 4A:
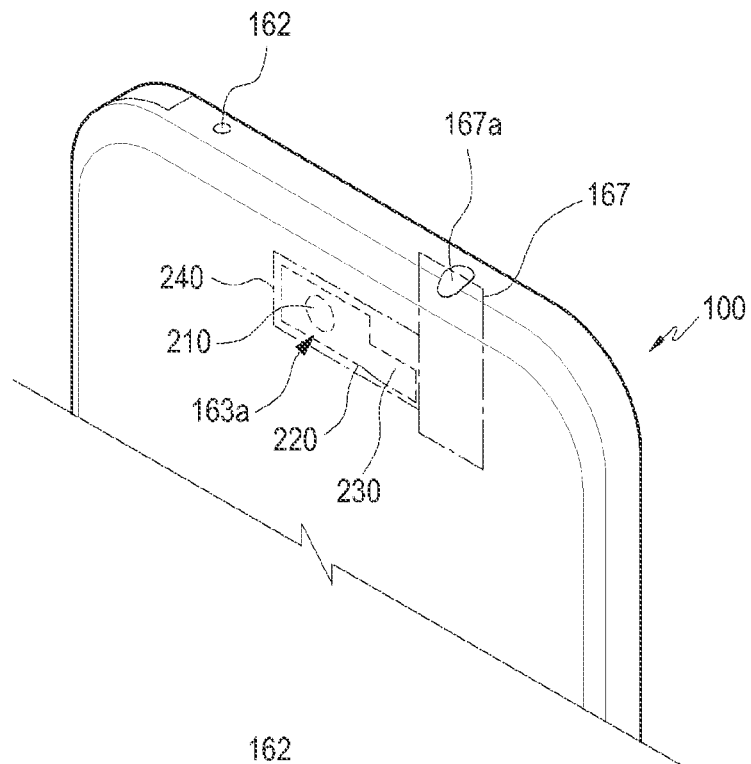
FIGS. 4A and 4B are partial views illustrating a rear surface of an electronic device having no rear sound guide according to a comparative example of an embodiment of the present invention.
Figure 4B:
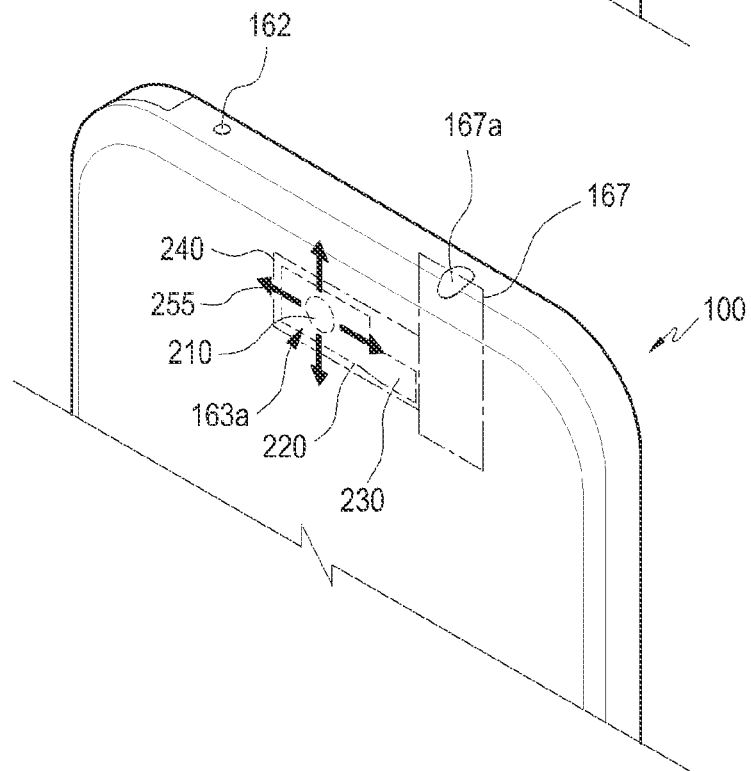

FIGS. 4A and 4B are partial views illustrating a rear surface of an electronic device having no rear sound guide according to a comparative example of an embodiment of the present invention.

Referring to FIG. 4A, the electronic device 100 has a receiving portion 240 therein, which receives the receiver 163*a*, and the receiver 163*a* is seated in the receiving portion 240. The receiver 163*a* includes a circular receiver body 210, a receiver case 220, and circuitry 230 for receiving a received sound signal and a control signal from the controller 110. The circuitry 230 may be a flexible printed circuit board (FPCB), a wire, a contact and/or the like.

Referring to FIG. 4B, the receiver 163*a* generates a front received sound toward the user and a rear received sound 255 which moves away from the user. The front received sound is reflected by a face of the user and directed to the outside, e.g., in a rear direction, of the electronic device 100, and the front received sound, i.e., the leaked sound, which is reflected, is heard by other people. On the other hand, the receiving portion 240 has a partially open structure within the electronic device 100, and the rear received sound 255 is dispersed through open regions of the receiving portion 240.

An embodiment of the present invention presents a process of offsetting the leaked sound by using the rear received sound.

Figure 5A:
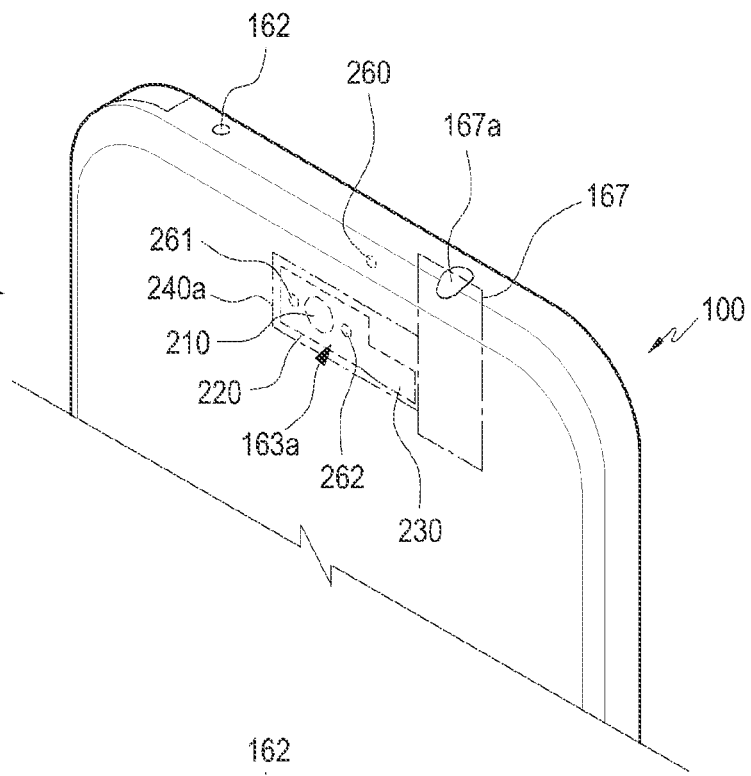
FIGS. 5A and 5B are partial views illustrating a rear surface of an electronic device having a rear sound guide according to an embodiment of the present invention.
Figure 5B:
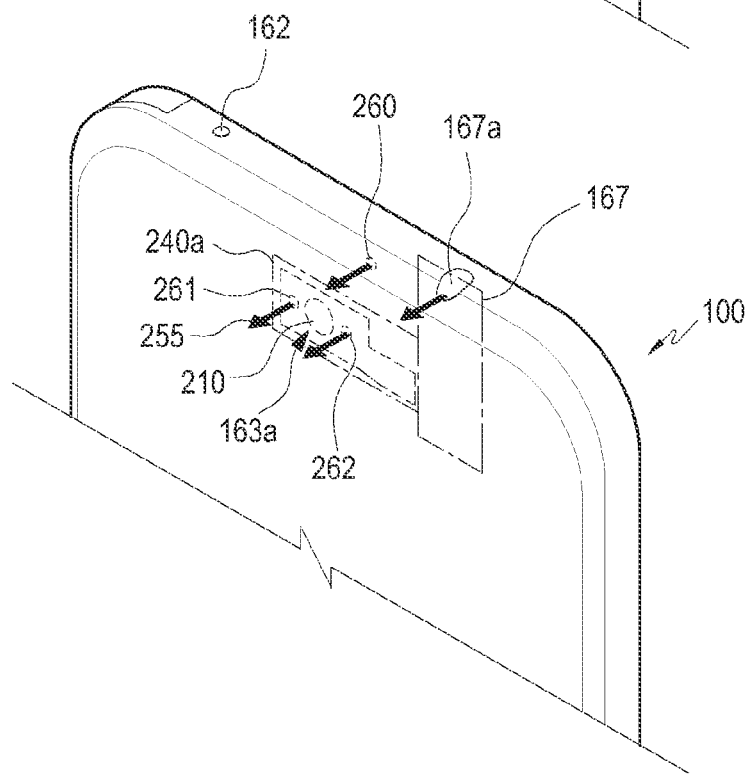

FIGS. 5A and 5B are partial views illustrating a rear surface of an electronic device having a rear sound guide according to an embodiment of the present invention.

Referring to FIG. 5A, the electronic device 100 has a receiving portion 240*a* therein, which receives the receiver 163*a*, and the receiver 163*a* is seated in the receiving portion 240*a*. The receiver 163*a* includes a circular receiver body 210, a receiver case 220, and circuitry 230 for receiving a received sound signal and a control signal from the controller 110. The electronic device 100 may include one or more holes 260, 261, and 262 to output the rear received sound 255 to an outside, and the receiving portions 240*a* include a guide for guiding the rear received sound 255 to the holes 260, 261 and 262.

Referring to FIG. 5B, the receiver 163*a* generates a front received sound toward the user and a rear received sound moving away from the user. The front received sound, which is reflected by the face of the user and leaks, is directed to the outside, e.g., in a rear direction, of the electronic device 100. On the other hand, the rear received sound 255 is guided by the guide of the receiving portion 240*a* and output through the holes 260, 261 and 262 in a rear case of the electronic device 100, resulting in the cancellation or reduction of the leaked sound through destructive interference between the leaked sound and the rear received sound. In the example, three holes 260, 261 and 262 of the rear case are shown as examples, but on the assumption that the holes communicate with the receiving portion 240*a*, one or more holes may be formed in a rear surface or a side surface of the electronic device 100. Further, exposed holes formed in the electronic device 100, such as the antenna insertion hole for the DMB antenna 141*a* of the electronic device 100, the pen insertion hole for the input unit 168 of the electronic device 100, the hole for the earphone connection jack 167, the receiving hole for a camera 152, the holes 260, 261 and 262 in the case and/or the like, may be configured to communicate with the receiving portion 240*a*. That is, the receiver 163*a* may output the received sound through the exposed holes such as the antenna insertion hole, the pen insertion hole, the hole for the earphone connection jack 167, the receiving hole for the camera 152, the holes 260, 261 and 262 in the case.

FIGS. 6A and 6B are views schematically illustrating a configuration capable of preventing leakage of a received sound from an electronic device according to an embodiment of the present invention.

Referring to FIG. 6A, the front received sound output, forward from the receiver 163*a*, is reflected by the face of the user and then is directed to the outside, e.g., in a rear direction, of the electronic device 100. According to an embodiment of the present invention, the rear received sound 271 of the receiver 163*a*, having a reverse phase to the leaked sound 270, is output to the outside of the electronic device 100, resulting in the cancellation or reduction of the leaked sound 270 through destructive interference between the leaked sound 270 and the rear received sound 271.

Referring to FIG. 6B, the front received sound output, forward from the receiver 163*a*, is reflected by the face of the user and then is directed to the outside of the electronic device 100. According to another embodiment of the present invention, the rear received sound 272 of the speaker 163, having a reverse phase to the leaked sound 272, is output to the outside of the electronic device 100, resulting in the cancellation or reduction of the leaked sound 270 through destructive interference between the leaked sound 270 and the rear received sound 272.

FIG. 7 is a view schematically illustrating a rear sound guide of an electronic device according to an embodiment of the present invention.

Referring to FIG. 7, the receiving portion 240a includes a guide 310 for guiding the rear received sound 273 to the hole. Such a guide 310 includes at least one rib and/or structure protruding in a direction from a front case toward a rear case of the electronic device 100, and encloses a receiver body 210 so as to seal opening portions around the receiver body 210 or forms a pathway approaching the hole as a duct. Side surfaces of the pathway are blocked by the guide 310, and an upper surface of the pathway is closed by the rear case. Accordingly, the rear received sound 273, introduced into the pathway of the guide 310, is guided along the guide 310, and then output to the outside through the holes.

Figure 8A:
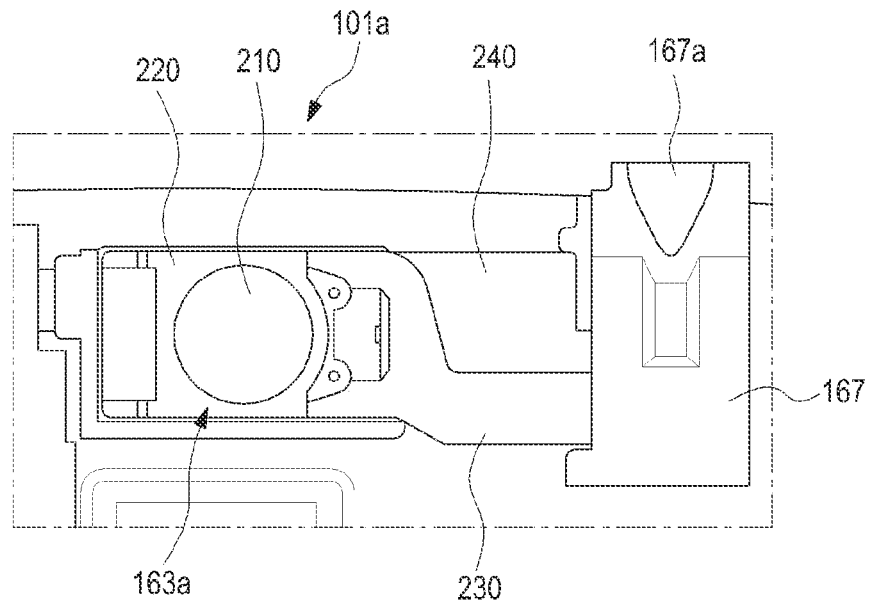
FIGS. 8A and 8B are partial views schematically illustrating an inside of an electronic device having no rear sound guide according to a comparative example of the present invention.
Figure 8B:
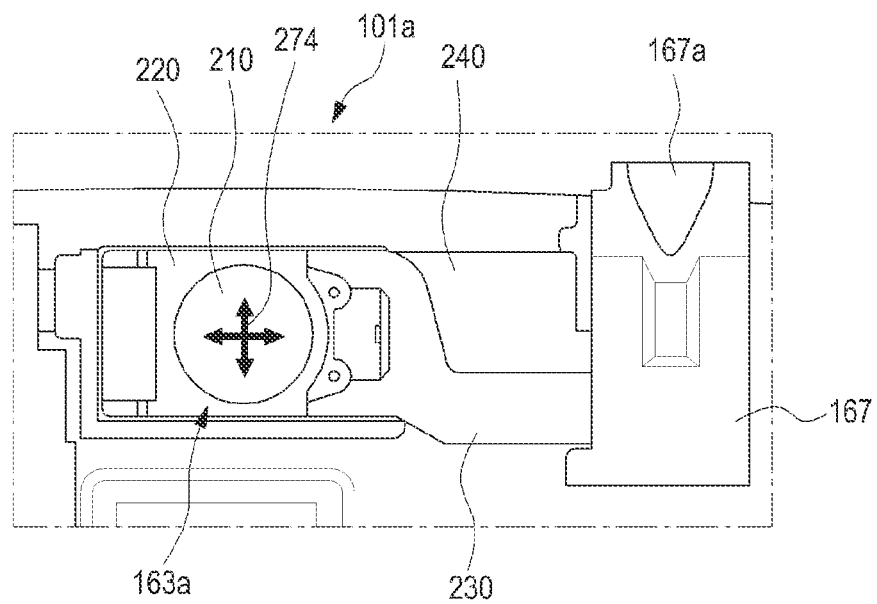

FIGS. 8A and 8B are partial views schematically illustrating an inside of an electronic device having no rear sound guide according to a comparative example of the present invention.

Referring to FIG. 8A, the electronic device 100 has a receiving portion 240 therein, which receives the receiver 163a, and the receiver 163a is seated in the receiving portion 240. The receiver 163a includes a circular receiver body 210, a receiver case 220, and circuitry 230 for receiving a received sound signal and a control signal from the controller 110. Further, the side of the receiving portion 240 in a direction from the circular receiver body 210 toward the circuitry 230 is blocked by the earphone connection jack 167.

Referring to FIG. 8B, the receiver 163a generates the rear received sound 274 in a direction of moving away from the user, i.e., towards the rear of the electronic device 100. The receiving portion 240 has a partially open structure within the electronic device 100, and the rear received sound is dispersed through open regions of the receiving portion 240.

Figure 9A:
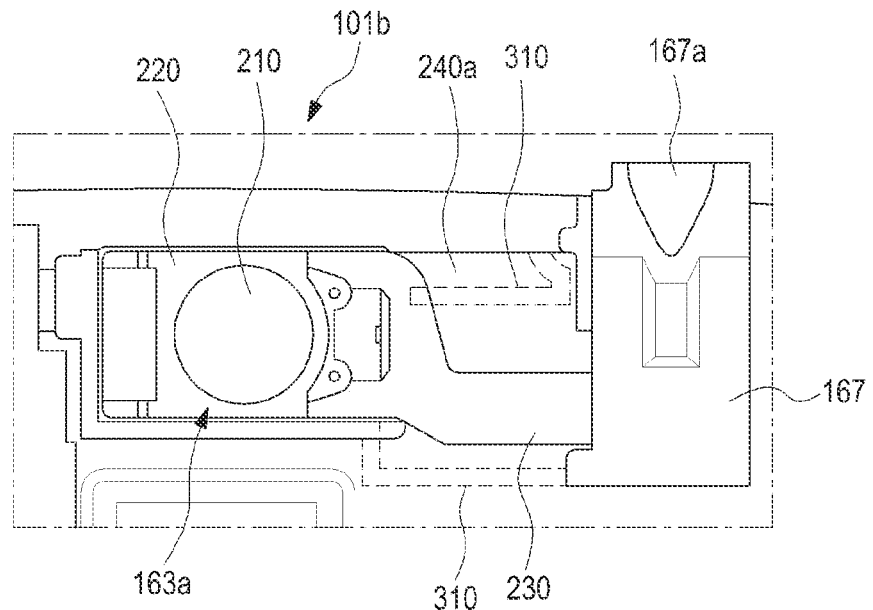
FIGS. 9A and 9B are planar views schematically illustrating an inside of an electronic device having a rear sound guide according to an embodiment of the present invention.
Figure 9B:
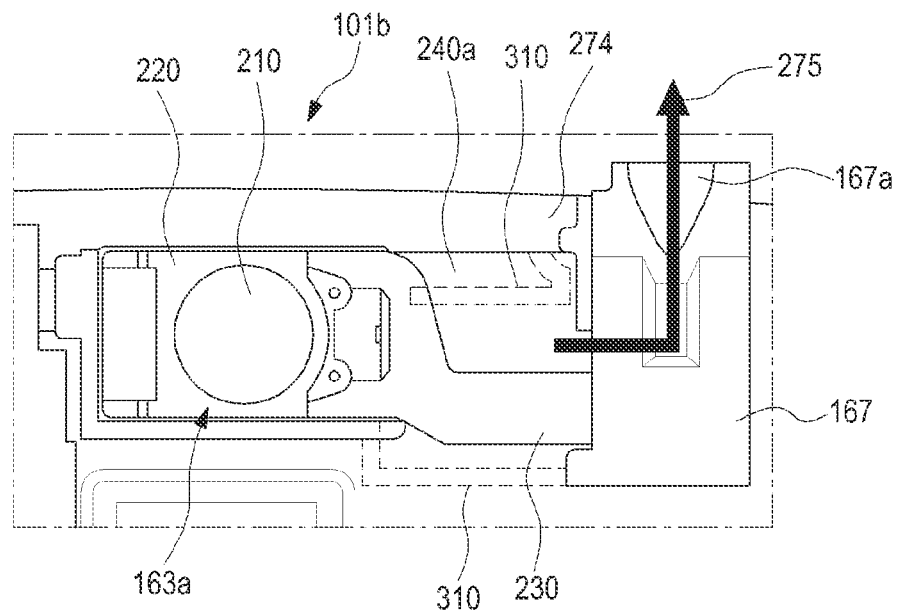
Figure 10:
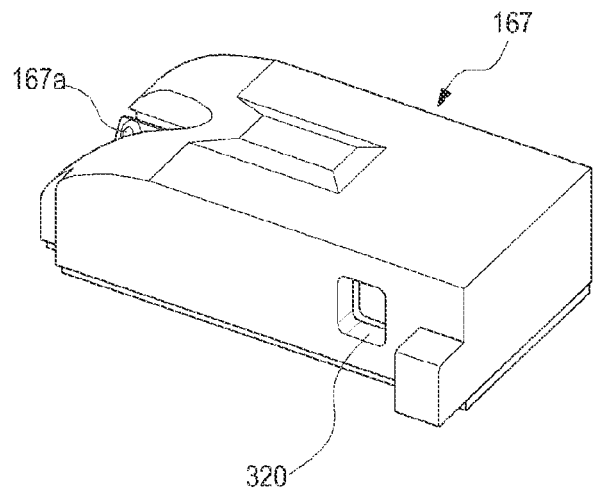
FIG. 10 is a perspective view schematically illustrating an inside of an earphone connection jack of an electronic device according to an embodiment of the present invention.
Figure 11:
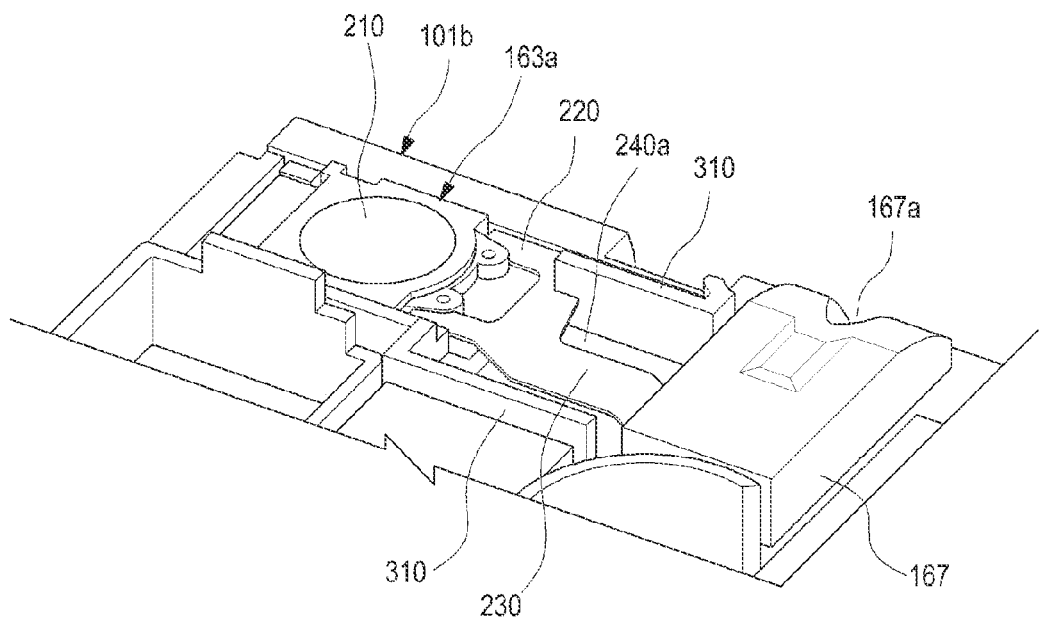
FIG. 11 is a perspective view schematically illustrating an inside of an electronic device having a rear sound guide according to an embodiment of the present invention.

FIGS. 9A and 9B are planar views schematically illustrating an inside of an electronic device having a rear received sound guide according to an embodiment of the present invention. FIG. 10 is a perspective view schematically illustrating an inside of an earphone connection jack of an electronic device according to an embodiment of the present invention. FIG. 11 is a perspective view schematically illustrating an inside of the electronic device having a rear received sound guide according to an embodiment of the present invention.

Referring to FIG. 9A, the receiving portion 240a include a guide 310 for blocking open portions thereof. In FIG. 9A, the guide 310 is depicted by a dotted line. Referring to FIGS. 9A through 11, the guide 310 consists of two ribs protruding in a direction from the front case 101b toward the rear case, and encloses the receiver 163a, along with other configurations of the receiving portion 240a so as to block the open portion around the receiver 163a and to form a pathway like a duct. Side surfaces of the pathway are blocked by the guide 310, an upper surface of the pathway is blocked by the rear case, and an end of the pathway in a direction from the circular receiver body 210 toward the circuitry 230 is closed by the earphone connection jack 167.

Referring to FIG. 10, the earphone connection jack 167 includes a second hole connected to and communicating with the first hole 167a in a side surface thereof contacting the receiving portion 240a.

Referring to FIG. 9B, the rear received sound 275 introduced in the pathway of the guide 310 is guided along the guide 310 to the second hole 320 of the earphone connection jack 167, and is then output to the outside of the electronic device 100 through the first hole 167a and the second hole 320.

Figure 12:
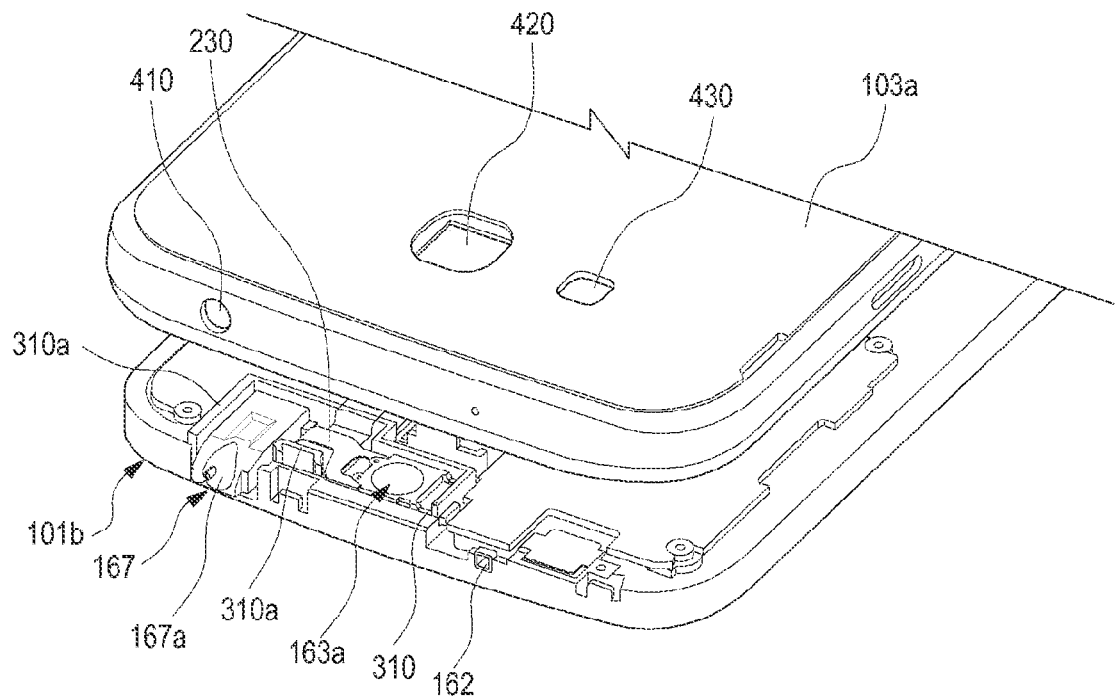
FIG. 12 is a perspective view schematically illustrating the inside of an electronic device having a rear sound guide according to another embodiment of the present invention.
Figure 13:
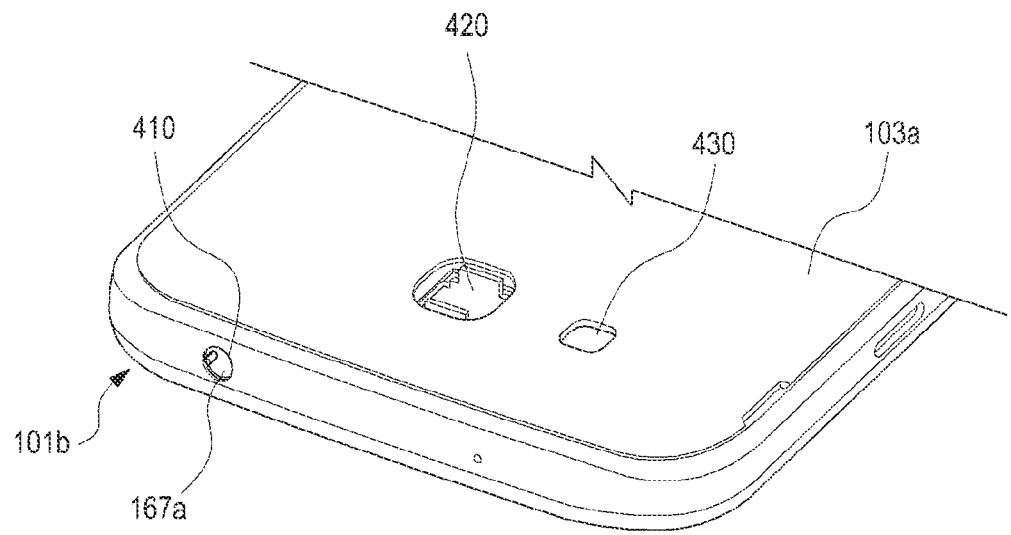
FIG. 13 is a perspective view schematically illustrating a rear surface of an electronic device having a rear sound guide according to an embodiment of the present invention.
Figure 14:
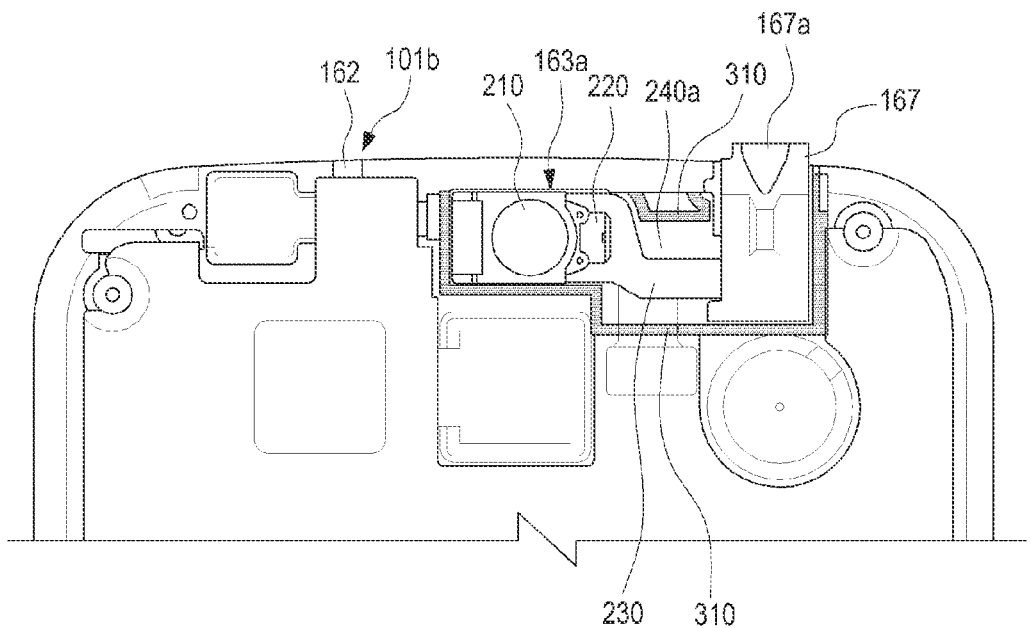
FIG. 14 is a planar view schematically illustrating an inside of an electronic device having a rear sound guide according to an embodiment of the present invention.

FIG. 12 is a perspective view schematically illustrating an inside of an electronic device 100 having the rear received sound guide according to another embodiment of the present invention. FIG. 13 is a perspective view schematically illustrating an appearance of an electronic device having the rear sound guide according to an embodiment of the present invention. FIG. 14 is a planar view schematically illustrating an inside of an electronic device having a rear sound guide according to an embodiment of the present invention.

The rear received sound guide 310a according to another example of the present invention is different only in shape from the rear received sound guide 310 according to the previous example provided of embodiments of the present invention.

Referring to FIG. 12, the receiving portion 240a includes a guide 310a for blocking open portions thereof. The guide 310a is constituted of two ribs protruding from the front case 101b toward the rear case, and encloses the receiver 163a along with other structures of the receiving portion 240a so as to block the open portions around the receiver 163a and to form a pathway like a duct. The guide 310a blocks not only at least one side surface of the receiver 163a, e.g., both side surfaces of the receiver 163a in this example, but also at least one surface of the earphone connection jack 167. Side surfaces of the pathway are blocked by the guide 310a, an upper surface of the pathway is blocked by the rear case 103a, and an end of the pathway in a direction from the circular receiver body 210 toward the circuitry 230 is closed by the earphone connection jack 167.

Referring to FIG. 13, the rear case 103a may have a third hole 410 communicating with the first hole 167a, a fourth hole 420 through which a second camera 152 is exposed, and a fifth hole 430 through which the flash 153 is exposed.

FIG. 14 is a planar view schematically illustrating an inside of an electronic device having a rear sound guide according to an embodiment of the present invention;

Referring to FIG. 14, the receiver 163a is seated in the receiving portion 240a, and the receiver 163a includes the circular receiver body 210, the receiver case 220, and the circuitry 230 for receiving the received sound signal and the control signal from the controller 110. The rear received sound 275 introduced in the pathway of the guide 310 is guided along the guide 310 to the second hole 320, as shown in FIG. 10, of the earphone connection jack 167, and then is output to the outside through the first hole 167a and the second hole 320.

Figure 15:
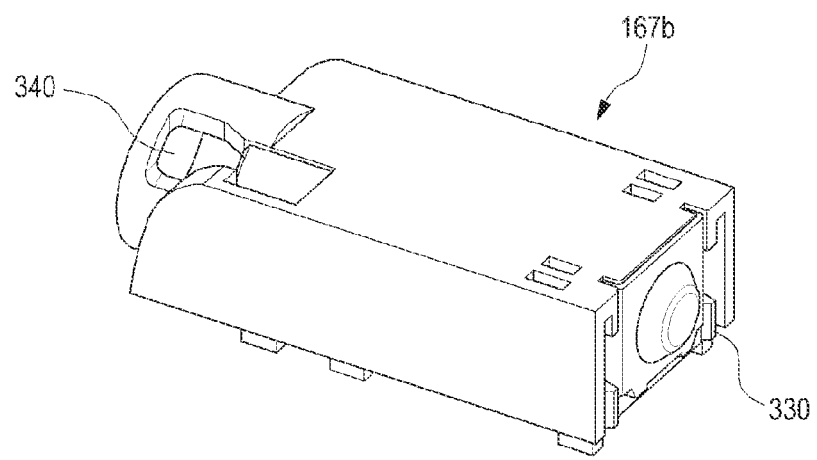
FIG. 15 is a perspective view schematically illustrating another example of an inside of an earphone connection jack of an electronic device according to an embodiment of the present invention.

FIG. 15 is a perspective view schematically illustrating another example of an inside of an earphone connection jack of an electronic device according to an embodiment of the present invention.

Referring to FIG. 15, the earphone connection jack 167b has no hole in a side surface contacting the receiving portion 240a, but may have at least one hole 330 or 340 in a rear surface or a front end portion thereof. The rear received sound is output to the outside of the electronic device 100 through the holes 330 and 340.

Figure 16:
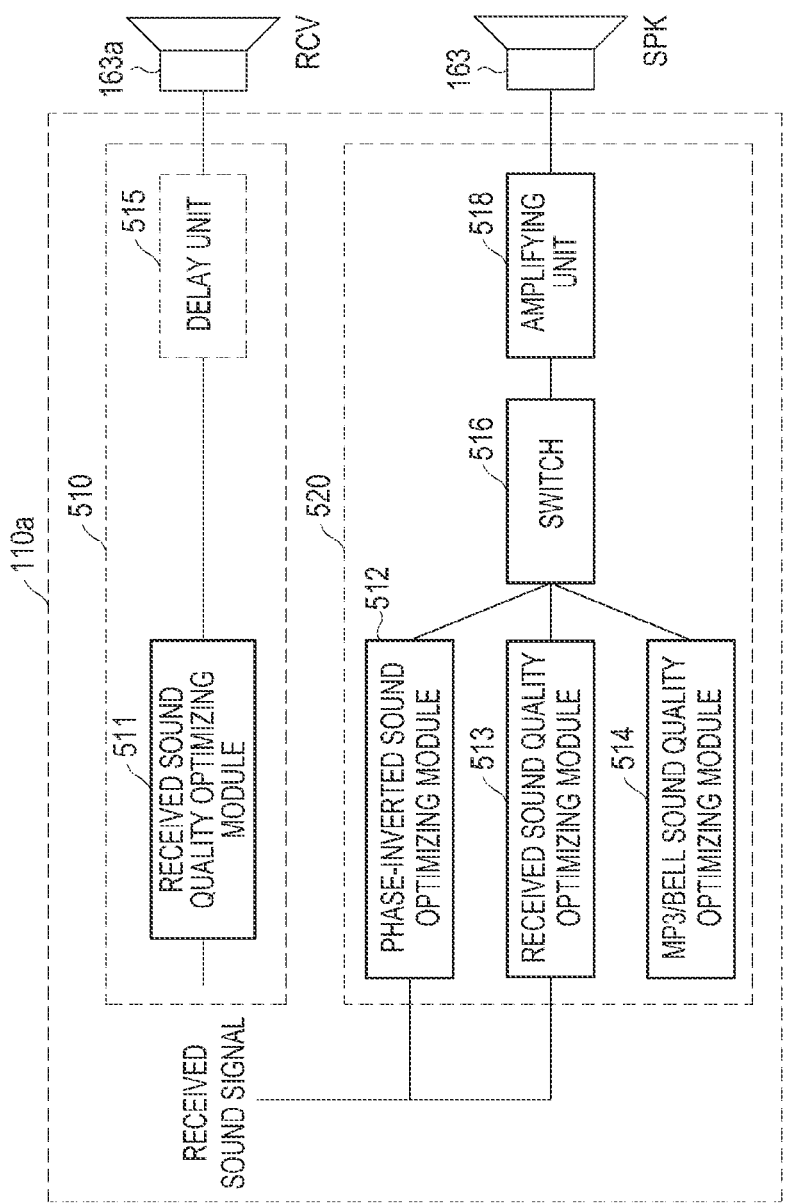
FIG. 16 is a block diagram illustrating a configuration of a controller for implementing a process of preventing leakage of a received sound according to a first embodiment of the present invention.

FIG. 16 is a block diagram illustrating a configuration of a controller for implementing a process of preventing leakage of a received sound according to a first embodiment of the present invention.

With reference to the accompanying drawings, each structural element such as a circuit, a module, a delay unit, a switch, an amplifying unit, or a codec constituting the controller may be constituted of software, circuitry or a device.

Further, a position of each structural element constituting the controller may be changed according to the circuitry and a configuration of a function optimizing process, and some structural elements may be integrated.

Referring to FIG. 16, the controller 110a includes a receiver control module 510 for controlling a quality of an output sound of the receiver 163a and a speaker control module 520 for controlling a quality of an output sound of the speaker 163. The received sound signal received through the communication module is output to the receiver 163a or the speaker 163 according to a selection of a user or an automatic selection based on a setting of a computing system configuration.

The receiver control module 510 includes a first received sound quality optimizing module 511 and a delay unit 515.

The first received sound quality optimizing module 511 adjusts an amount of sound of the received sound signal (or intensity or magnitude), a frequency characteristic, a noise characteristic, and/or the like, based on predetermined parameters. The adjustment of the amount of the sound of the received sound signal is performed by using the amplifying unit and/or the like, and the adjustment of the frequency characteristic or the noise characteristic is performed by using a filter and/or the like.

The delay unit 515 delays and outputs the received sound signal input from the first received sound quality optimizing module 511 for a predetermined time so that the received sound output through the receiver 163a and the received sound having an inverse phase with respect to the phase of the received sound output through the receiver 163a and output through the speaker 163 can be simultaneously output, i.e., synchronized. The received sound output through the speaker 163 and the received sound output through the receiver 163a have mutually inverted phases. The received sound output through the speaker 163 has a shape which is generated by phase-inverting the received sound output through the receiver 163a.

The delay unit 515 may be selectively operated only if it is necessary. The delay unit 515 may be connected to a switch 516 or an amplifying unit 518 instead of the first received sound quality optimizing module 511.

The speaker control module 520 includes a phase-inverted sound optimizing module 512, a second received sound quality optimizing module 513, an MP3/bell sound quality optimizing module 514, the switch 516 and the amplifying unit 518.

The phase-inverted sound optimizing module 512 adjusts an amount of sound of the received sound signal (or intensity or magnitude), a frequency characteristic, a noise characteristic, and/or the like, based on predetermined parameters. In a mode of preventing leakage of the received sound, the same received sound signal is input into the first received sound quality optimizing module 511 and the phase-inverted sound optimizing module 512. If it is not in the mode of preventing the leakage of the received sound, the received sound signal is input to only one of the first and second received sound quality optimizing modules 511 and 513. For example, the phase-inverted sound quality optimizing module 512 may be a low pass filter having a cutoff frequency of 2 Khz, and/or a tuned filter.

The second received sound quality optimizing module 513 adjusts an amount of sound of the received sound signal (or intensity or magnitude), a frequency characteristic, a noise characteristic, and/or the like, based on predetermined parameters.

The MP3/bell sound quality optimizing module 514 adjusts an amount of sound of an MP3 signal or a bell signal (or, intensity or magnitude) input from the storage unit, a frequency characteristic, a noise characteristic, and/or the like, based on predetermined parameters. The switch 516 is connected to one of the phase-inverted sound optimizing module 512, the second received sound quality optimizing module 513, and the MP3/bell sound quality optimizing module 514 according to the control of the controller 110a. That is, the switch 516 is connected to the phase-inverted sound optimizing module 512 in the mode of preventing the leakage of the received sound from the receiver, to the second received sound quality optimizing module 513 in the mode of outputting the received sound through the speaker, and to the MP3/bell sound quality optimizing module 514 in the mode of outputting the MP3/bell output.

The amplifying unit 518 amplifies and outputs the received sound signal or the MP3/bell signal from the switch 516 according to a predetermined gain.

The receiver 163a converts the received sound signal input from the delay unit 515 into the received sound through an electric-sound conversion, and then outputs the received sound forward from the electronic device 100.

The speaker 163 converts the received sound signal input from the amplifying unit 518 into the phase-inverted sound through the electric-sound conversion, and then outputs the phase-inverted sound to the outside of the electronic device 100, e.g., towards the rear of the electronic device 100. Further, the speaker 163 converts the MP3/bell signal input from the amplifying unit 518 into the MP3/bell sound through the electric-sound conversion, and then outputs the MP3/bell sound to the outside of the electronic device 100, e.g., towards the rear of the electronic device 100.

A signal input to a positive terminal and a negative terminal of the receiver 163a has an inverted phase to a signal input to a positive terminal and a negative terminal of the speaker 163. For example, if a voltage signal of 1, 0, 1, 0 is applied to the receiver 163a, the voltage signal of 1, 0, 1, 0 is applied to the positive terminal of the receiver 163a, and a bias signal is applied to the negative terminal of the receiver 163a. On the other hand, if a voltage signal of 1, 0, 1, 0 is applied to the speaker 163, the voltage signal of 1, 0, 1, 0 is applied to the positive terminal of the speaker 163, and a bias signal is applied to the negative terminal of the speaker 163.

In other words, when the same signal is input to the receiver 163a and the speaker 163, the sound signal output from the receiver 163a has the inverted phase to the sound signal output from the speaker 163. Accordingly, the received sound of the receiver 163a and the phase-inverted received sound of the speaker 163 are cancelled out by the destructive interference, or the amount of the received sound thereof is remarkably reduced.

In another example, the delay unit 515 is disposed in front of the first received sound quality optimizing module 511, and a second delay unit is disposed in front of the phase-inverted sound quality optimizing module 512, or interposed between the phase-inverted sound quality optimizing module 512 and the switch 516.

Further, a connection of (or signal input to) the positive terminal and the negative terminal of the receiver 163a is performed in an identical manner to a connection of (or signal input to) the positive terminal and the negative terminal of the speaker 163, and the phase-inverted sound quality optimizing module 512 inverts a phase in the input and received sound signal and output the phase-inverted received sound signal.

FIGS. 17A-C illustrate a received sound of a receiver and a speaker, and the destructive interference of the received sounds.

Referring to FIG. 17A, the received sound of the receiver 163a is shown.

Referring to FIG. 17B, the phase-inverted received sound of the speaker 163 is shown.

Referring to FIG. 17C, the sound signal which is cancelled out by the destructive interference is shown.

Figure 18:
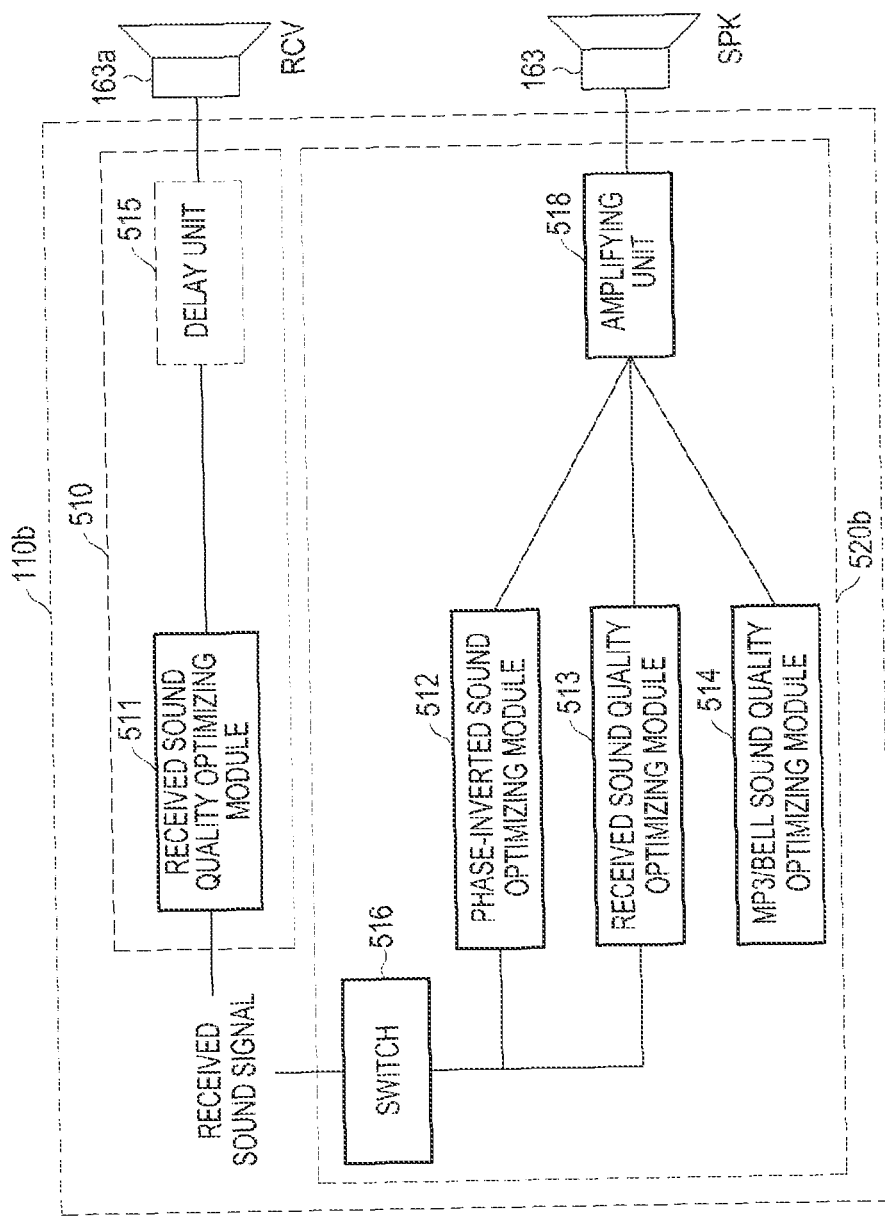
FIG. 18 is a block diagram illustrating a configuration of a controller for implementing a process of preventing leakage of a received sound according to a second embodiment of the present invention.

FIG. 18 is a block diagram illustrating a configuration of a controller for implementing a process of preventing leakage of a received sound according to a second embodiment of the present invention.

Referring to FIG. 18, the controller 110b has a configuration similar to that of the controller shown in FIG. 16, and has only a difference in that the switch 516 is not connected to the rear ends but to the front ends of the phase-inverted sound optimizing module 512 and the second received sound quality optimizing module 513.

The switch 516 is connected to one of the phase-inverted sound optimizing module 512 and the second received sound quality optimizing module 513 according to the control of the controller 110a. That is, the switch 516 is connected to the phase-inverted sound optimizing module 512 in the mode of preventing the leakage of the received sound, while being connected to the second received sound quality optimizing module 513 in the mode of outputting the received sound.

The amplifying unit 518 amplifies and outputs the received sound signal or the MP3/bell signal, which is input from one of the phase-inverted sound optimizing module 512, the second received sound quality optimizing module 513, and the MP3/bell sound quality optimizing module 514, according to the predetermined gain.

Figure 19:
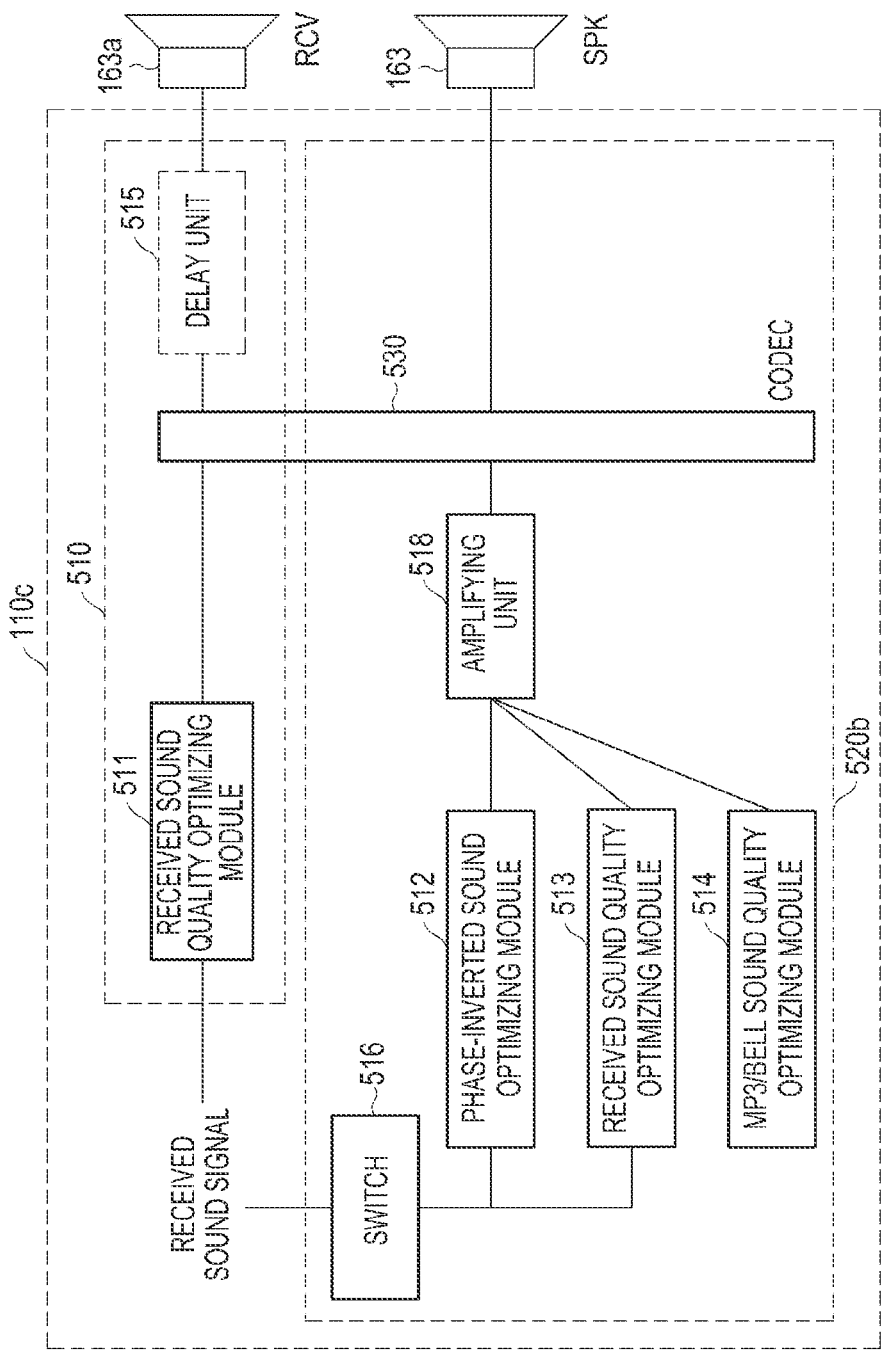
FIG. 19 is a block diagram illustrating a configuration of a controller for implementing a process of preventing leakage of a received sound according to a third embodiment of the present invention.

FIG. 19 is a block diagram illustrating a configuration of a controller for implementing a process of preventing leakage of a received sound according to a third embodiment of the present invention.

Referring to FIG. 19, the controller 110c has a structure similar to that of the controller shown in FIG. 18, and has only a difference in that the controller 110c further includes a codec 530 for decoding the received signal or the MP3/bell signal.

The codec 530 is interposed between the first received sound quality optimizing module 511 and the delay unit 515, and between the amplifying unit 518 and the speaker 163. The received signal or the MP3/bell signal may be coded in various manners such as Pulse Code Modulation (PCM) and/or the like, and the codec 530 decodes and outputs the coded received sound signal or the MP3/bell signal to the receiver 163a or the speaker 163.

Alternatively, the codec 530 may be disposed at a front end of the first received sound quality optimizing module 511 and the switch 516, or plural codecs may be interposed between the first received sound quality optimizing module 511 and the delay 515, and between the amplifying unit 518 and the speaker 163, respectively. Further, the plural codec may be disposed at specific positions of the receiver control module 510 and the speaker control module 520b respectively.

Figure 20:
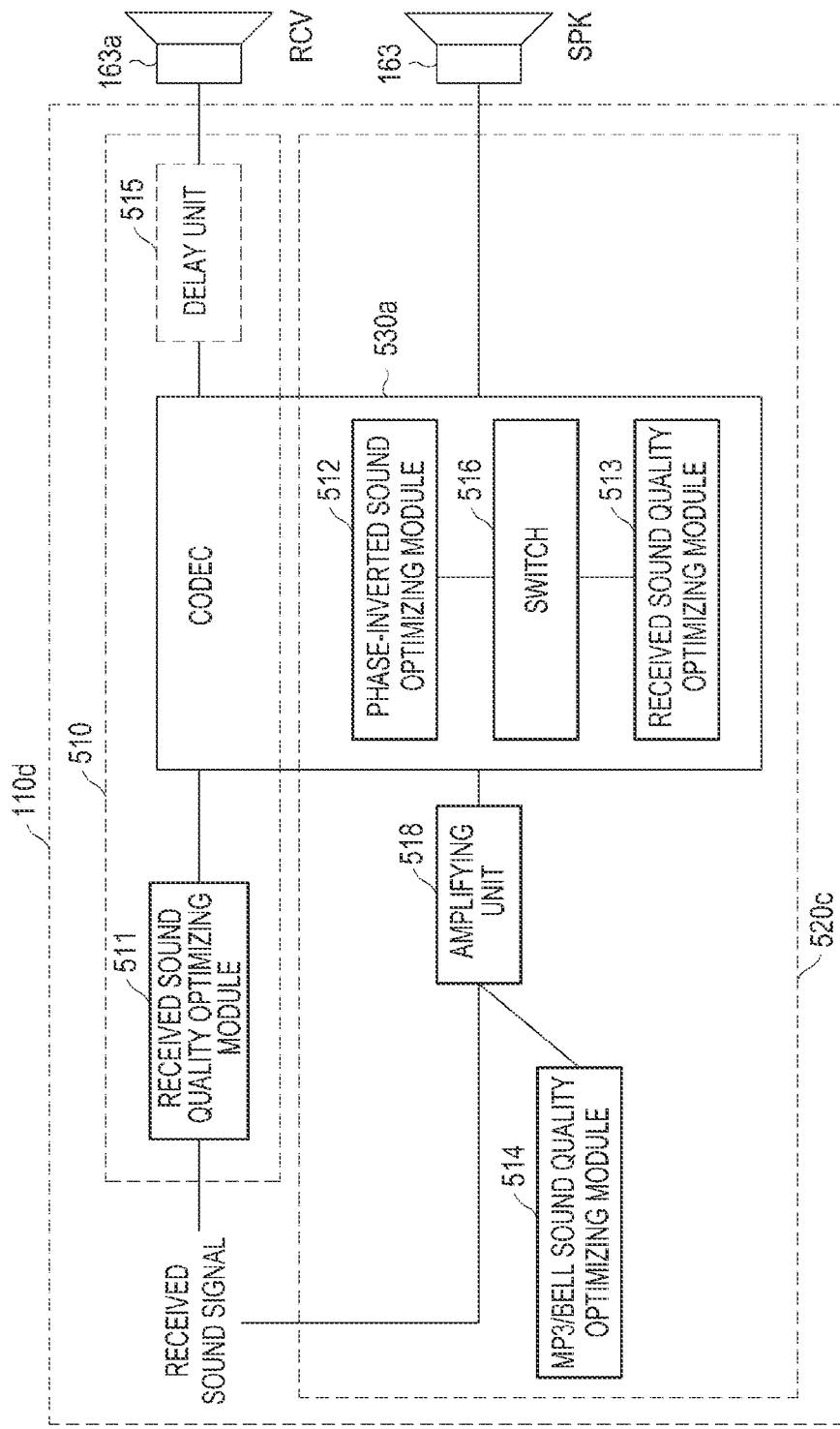
FIG. 20 is a block diagram illustrating a configuration of a controller for implementing a process of preventing leakage of a received sound according to a fourth embodiment of the present invention.

FIG. 20 is a block diagram illustrating a configuration of a controller for implementing a process of preventing leakage of a received sound according to a fourth embodiment of the present invention.

Referring to FIG. 20, the controller 110d has a configuration similar to that of the controller shown in FIG. 19, and has only a difference in that the switch 516 includes the phase-inverted sound optimizing module 512 and the second received sound quality optimizing module 513.

The codec 530 is interposed between the first received sound quality optimizing module 511 and the delay unit 515, and between the amplifying unit 518 and the speaker 163. The received signal or the MP3/bell signal may be coded in various manners such as Pulse Code Modulation (PCM) and/or the like, and the codec 530 decodes and outputs the coded received sound signal or the MP3/bell signal to the receiver 163a or the speaker 163. Further, the switch 516, the phase-inverted sound optimizing module 512 and the second received sound quality optimizing module 513 are located in the codec 530a. The received sound signal output from the phase-inverted sound quality optimizing module 512 or the second received sound quality optimizing module 513 is decoded by the codec 530a and output to the speaker 163.

Although the touch screen has been illustrated as a representative example of the display unit displaying the screen in the above-described embodiments, a general display unit, such as a Liquid Crystal Display (LCD), an Organic Light Emitting Diode (OLED), and a Light Emitting Diode (LED), which do not have a touch detection function may also be used instead of the touch screen.

It may be appreciated that the embodiments of the present invention may be implemented in software, hardware, or a combination thereof. Any such software may be stored, for example, in a volatile or non-volatile storage device such as a ROM, a memory such as a RAM, a memory chip, a memory device, a memory such as an IC, or an optical or magnetic recordable and machine-readable medium, e.g., computer-readable medium, such as a CD, a DVD, a magnetic disk, or a magnetic tape, regardless of its ability to be erased or its ability to be re-recorded. It is appreciated that the storage unit included in the electronic device is one example of the machine-readable storage media suitable for storing a program or programs including commands for implementing various embodiments of the present invention. Accordingly, the present invention includes a program that includes a code for implementing an apparatus or a method defined in any claim in the present specification and a machine-readable storage medium that stores such a program. Further, the program may be electronically transferred by a predetermined medium such as a communication signal transferred through a wired or wireless connection, and the present invention appropriately includes equivalents of the program.

Further, the electronic device can receive the program from a program providing apparatus connected to the device wirelessly or through a wire and store the received program. The program providing device may include a program having instructions which enable the electronic device to perform the method of preventing the leakage of the received sound, a memory for storing information necessary for an implementation of the method of preventing the leakage of the received sound, a communication unit for performing wired or wireless communication with the electronic device, and a controller for transmitting a corresponding program to the electronic device automatically or in response to a request of the electronic device.

Although specific embodiments are described in the above description of the present invention, various modifications can be made without departing from the scope of the present invention. Accordingly, the scope of the present invention shall not be determined by the above-described embodiments, and is to be determined by the following claims and their equivalents.

What is claimed is:

1. An electronic device for preventing leakage of a received sound, the electronic device comprising:
 a receiver configured to output the received sound;
 a receiving portion configured to receive the receiver;
 a first hole which is in contact with the receiving portion; and a second hole which is connected to the first hole and is exposed to outside of the electronic device, wherein the first and second holes are formed on one of an earphone connection jack, an antenna insertion portion, a pen insertion portion and a camera receiving portion.

2. The electronic device as claimed in claim 1, further comprising a guide which guides the received sound to the first hole.

3. The electronic device as claimed in claim 2, wherein the guide includes at least one rib formed on a case of the electronic device to close at least one side surface of the receiver.

4. The electronic device as claimed in claim 2, wherein the guide defines a pathway extending from the receiver to the first hole.

5. The electronic device as claimed in claim 2, wherein the guide includes at least one rib or structure formed on a case of the electronic device to close at least one side surface of the receiver.

6. An electronic device for preventing leakage of a received sound, the electronic device comprising:
   a receiver configured to output a first received sound;
   a speaker configured to output a phase-inverted received sound having an inverse phase with respect to a phase of the first received sound in a mode of preventing leakage of the first received sound, and to output a second received sound in a mode of outputting the second received sound; and
   a controller configured to control the speaker to output the phase-inverted received sound in the mode of preventing leakage of the first received sound, and to output the second received sound in the mode of outputting the second received sound,
   wherein the controller comprises a codec which decodes the phase-inverted received sound or the second received sound.

7. The electronic device as claimed in claim 6, wherein the controller is configured to adjust at least one of an amount, a frequency characteristic and a noise characteristic of the first received sound.

8. The electronic device as claimed in claim 7, wherein the controller is configured to synchronize the first received sound output through the receiver with the phase-inverted sound output through the speaker so that the first received sound of the receiver and the phase-inverted received sound are simultaneously output.

9. The electronic device as claimed in claim 6, wherein the controller comprises:
   a first received sound quality optimizing module configured to adjust at least one of an amount, a frequency characteristic, and a noise characteristic of the phase-inverted received sound; and
   a second received sound quality optimizing module configured to adjust at least one of an amount, a frequency characteristic, and a noise characteristic of the second received sound.

10. The electronic device as claimed in claim 9, wherein the controller further comprises a third received sound quality optimizing module configured to adjust at least one of an amount, a frequency characteristic, and a noise characteristic of an MP3 signal or a bell signal.

11. An electronic device for preventing leakage of a received sound, the electronic device comprising:
   a receiver configured to output a first received sound;
   a speaker configured to output a phase-inverted received sound having an inverse phase with respect to a phase of the first received sound in a mode of preventing leakage of the first received sound, and to output a second received sound in a mode of outputting the second received sound; and
   a controller configured to control the speaker to output the phase-inverted received sound in the mode of preventing leakage of the first received sound, and to output the second received sound in the mode of outputting the second received sound,
   wherein the controller comprises:
      a first received sound quality optimizing module configured to adjust at least one of an amount, a frequency characteristic, and a noise characteristic of the phase-inverted received sound;
      a second received sound quality optimizing module configured to adjust at least one of an amount, a frequency characteristic, and a noise characteristic of the second received sound; and
      a switch connected to one of the first and second received sound quality optimizing modules.

12. The electronic device as claimed in claim 11, wherein the controller comprises a codec which decodes the phase-inverted received sound or the second received sound.

13. The electronic device as claimed in claim 11, wherein the controller is further configured to adjust at least one of an amount, a frequency characteristic, and a noise characteristic of the first received sound.

14. The electronic device as claimed in claim 11, wherein the controller is further configured to synchronize the first received sound output through the receiver with the phase-inverted sound output through the speaker, so that the first received sound of the receiver and the phase-inverted received sound are simultaneously output.

15. The electronic device as claimed in claim 11, wherein the controller further comprises a third received sound quality optimizing module configured to adjust at least one of an amount, a frequency characteristic, and a noise characteristic of an MP3 signal or a bell signal.

16. An electronic device for preventing leakage of a received sound, the electronic device comprising:
   a receiver configured to output a first received sound;
   a speaker configured to output a phase-inverted received sound having an inverse phase with respect to a phase of the first received sound in a mode of preventing leakage of the first received sound, and to output a second received sound in a mode of outputting the second received sound; and
   a controller configured to control the speaker to output the phase-inverted received sound in the mode of preventing leakage of the first received sound, and to output the second received sound in the mode of outputting the second received sound,
   wherein a signal input of a positive terminal and a negative terminal of the receiver and a signal input of a positive terminal and a negative terminal of the speaker are mutually inverted, and the outputs of the receiver and the speaker have mutually inverted phases.

17. The electronic device as claimed in claim 16, wherein the controller is further configured to adjust at least one of an amount, a frequency characteristic, and a noise characteristic of the first received sound.

18. The electronic device as claimed in claim 16, wherein the controller is further configured to synchronize the first received sound output through the receiver with the phase-inverted sound output through the speaker, so that the first received sound of the receiver and the phase-inverted received sound are simultaneously output.

* * * * *